United States Patent
Kanaoka

(10) Patent No.: US 7,339,339 B2
(45) Date of Patent: Mar. 4, 2008

(54) CONTROL SYSTEM OF FLOATING MOBILE BODY

(75) Inventor: Katsuya Kanaoka, Kusatsu (JP)

(73) Assignee: The Ritsumeikan Trust, Kyoto-shi (JP)

(\*) Notice: Subject to any disclaimer, the term of this patent is extended or adjusted under 35 U.S.C. 154(b) by 9 days.

(21) Appl. No.: 10/590,344

(22) PCT Filed: Feb. 25, 2005

(86) PCT No.: PCT/JP2005/003158

§ 371 (c)(1),
(2), (4) Date: Aug. 24, 2006

(87) PCT Pub. No.: WO2005/081082

PCT Pub. Date: Sep. 1, 2005

(65) Prior Publication Data

US 2007/0200525 A1    Aug. 30, 2007

(30) Foreign Application Priority Data

Feb. 25, 2004    (JP) .............................. 2004-050586

(51) Int. Cl.
*B25J 5/00* (2006.01)

(52) U.S. Cl. ........................... 318/568.12; 318/568.21; 318/568.22; 318/569; 318/582; 318/588; 318/589; 901/30

(58) Field of Classification Search ........... 318/568.21, 318/568.22, 569, 582, 588, 589; 901/30; 706/123; 395/21

See application file for complete search history.

(56) References Cited

U.S. PATENT DOCUMENTS 6,169,981 B1\* 1/2001 Werbos ........................ 706/23

FOREIGN PATENT DOCUMENTS

| JP | 10-035587 | 2/1998 |
| JP | 2000-084016 | 3/2000 |
| JP | 2000-203491 | 7/2000 |
| JP | 2004-098866 | 4/2004 |

\* cited by examiner

OTHER PUBLICATIONS

[Non-Patent Document 1] Kanaoka, Nakayama, Hayashi and Kawamura, "Thrust Local Feed-Back Control for Realization of High Speed and Precise Motion in Water", proceedings of the Robotics and Mechatronics Conference '03, the Japan Society of Mechanical Engineers, 2P1-2F-A6, 2003.

*Primary Examiner*—Karen Masih
(74) *Attorney, Agent, or Firm*—Jordan and Hamburg LLP

(57) ABSTRACT

An object of the invention is to provide a floating mobile object control system capable of causing a floating mobile object to stand still in a predetermined position with high precision or track a target trajectory with high precision, even under disturbances caused by waves, tidal current, etc.

A floating mobile object control system of the present invention capable of achieving the above object is a control system 1 for a floating mobile object 10, in which the floating mobile object includes: a main body part B that can be considered as a single rigid body constituting a part of the floating mobile object; an effector part E for generating a thrust for the floating mobile object; and a thrust transfer gate G for dynamically connecting the main body part and the effector part, the thrust transfer gate being adapted to be able to actually measure a thrust from the effector part acting on the main body part, and a measured value for the thrust from the thrust transfer gate G is used to obtain a thrust command to the effector part E (FIG. 4).

8 Claims, 14 Drawing Sheets

CONTROL SYSTEM OF FLOATING MOBILE BODY

TECHNICAL FIELD

The present invention relates to control systems for floating mobile objects in water, air, outer space, etc., or mobile objects for sliding on a plane.

BACKGROUND ART

First, a prior known floating mobile object control technique is described with reference to FIGS. 11 through 14 and so on. FIG. 11 is a schematic diagram of a prior known floating mobile object, and FIGS. 11 through 14 are schematic diagrams illustrating a prior known floating mobile object control technique.

As shown in FIG. 11, in order to control the position and velocity of the main body of a floating mobile object 10 such as an underwater robot, the main body is provided with a sensor 13 by which the position and velocity of the main body of the floating mobile object 10 are sensed and fed to a subtraction circuit 11 in a computer P. The subtraction circuit 11 is also fed with a signal indicating desired position and velocity from an operator H. An output of the subtraction circuit 11 is provided to a thruster control circuit 12 for controlling thrusters T provided as thrust generation means (effectors) on the floating mobile object 10, thereby controlling the position and velocity of the floating mobile object 10 (which is what is called position/velocity feedback control).

FIG. 12 is a block diagram for controlling the floating mobile object 10 shown in FIG. 11. An effector thrust command signal, which is an output of the thruster control circuit 12, is fed to the thrusters T having a predetermined thrust characteristic 14, thereby feeding an effector thrust to the floating mobile object 10, so that dynamics of the floating mobile object 10, i.e., dynamic input/output characteristics, are obtained as denoted by reference character 15, and the position and velocity of the main body is sensed by the sensor 13 and fed to the subtraction circuit 11 as described above.

As such, in the conventional control of a floating mobile object, information concerning the position and velocity of a floating mobile object, which is a subject of control, is fed back to directly handle a thrust command to an effector, and in the case of a floating mobile object generally having an effector with a relatively slow response speed, it takes a time while after the command is sent to the effector, the effect of which is reflected in the position and velocity of the floating mobile object, until the sensor obtains them, therefore there arises a problem where control performance is adversely affected (which is what is called a sensing delay problem). This tendency becomes noticeable as the mass of the floating mobile object is increased or the thrust of the effector is decreased.

Further, a floating mobile object in a stream of water or air is always affected by hydrodynamic disturbances such as waves and tidal current or wind, and in addition, as shown in FIG. 11, the floating mobile object 10 in water is connected with an umbilical cable C (a feeder, a communication line or the like) from above the water, which often pulls the floating mobile object 10, therefore in the case of the above-described control technique, a response to unknown disturbances takes time, causing a problem where control performance is adversely affected.

Next, in the case where the floating mobile object 10 is further provided with a robot arm A having a plurality of links as shown in FIG. 11, a block diagram as illustrated in FIG. 13 is constructed. A reaction force and torque by the robot arm A as denoted by reference character 16 is added to effector thrusts by the thrusters T as illustrated by an adding circuit 17. Accordingly, the reaction force and torque from the robot arm A disturbs the action of the floating mobile object 10, i.e., the position and velocity, and the thrusters T are controlled to correct errors in the position and velocity of the floating mobile object 10 that are caused by the reaction force and torque of the robot arm A. As such, the action (position and velocity) of the floating mobile object 10 is disturbed by the reaction force and torque from the robot arm A, and therefore conventional attitude control activates the thrusters T so as to correct the resulting errors in the position and velocity.

Specifically, the prior known control technique operates activates the thrusters T after the floating mobile object 10 is moved by the reaction force and torque of the robot arm A, and therefore the so-called sensing delay problem where a response speed to disturbances is low still remains unsolved.

FIG. 14 illustrates a block diagram of another conventional art. This control technique takes into consideration mutual interference between the motion of the robot arm A and the motion of the main body of the floating mobile object 10, and simultaneously determines an effector thrust and a robot arm joint torque, such that their motions are consistent with their respective purposes. In this conventional art, the floating mobile object 10 provided with the robot arm A is configured as a multi-link system, and based on its equation of motion, influence of each joint torque of each robot arm on the motion of the main body of the floating mobile object 10 is expressed in a mathematical formula, which is solved to determine propulsion power of the main body of the floating mobile object 10 (which is what is called model-based control).

In the conventional art of FIG. 14, an effector thrust command signal from a thruster/robot arm control circuit 18 is fed to the thrusters T, and a torque command signal of the robot arm A is fed to a joint actuator 19. As such, complex system dynamics 20 of the main body of the floating mobile object 10 and the robot arm A are formed by effector thrusts outputted from the thrusters T and a joint torque by the joint actuator 19, and the sensor 13 senses the position and velocity of the main body of the floating mobile object 10 and feeds them to the subtracter 11 to which a signal representing desired position and attitude of the main body of the floating mobile object 10 is fed. Also, robot arm control variables from the complex system dynamics 20, i.e., signals representing the position, attitude, joint angle, velocity, hand reaction force, etc., are fed to the subtraction circuit 21 to which target values for the control variables of the robot arm A are fed. Outputs of the subtracters 11 and 21 are fed to the thruster/robot arm control circuit 18.

Specifically, this control technique takes into consideration the mutual interference between the motion of the robot arm A and the motion of the main body of the floating mobile object 10, and simultaneously determines an effector thrust and a robot arm joint torque, such that their motions are consistent with their respective purposes. While this advantageously allows the motion of the main body of the floating mobile object 10 to be accurately controlled, there are the following problems (1) through (3).

(1) The object dynamics are generally complicated, and if the robot arm A has six axes, the dynamics take a form of a link joining seven rigid bodies including the main body of the floating mobile object 10. In the case where there are a plurality of robot arms A, the dynamics become more significantly complicated. Arithmetic of such control system is considerably time-consuming, and imposes a heavy computation load on the computer. Therefore, it is practically very difficult to configure the above-described control system with a small computer.

(2) Also, the above-described control system requires a number of dynamic parameters such as the mass, moment of inertia and gravitational center position of each link of the robot arm A and the main body, and proper control cannot be realized by using these dynamic parameters unless their values are all correct. Accordingly, in the case of holding an object with the robot arm A, the mass, moment of inertia and gravitational center position of the held object should be provided appropriately. Thus, it is required to have a database of objects that can be held or measure dynamic characteristics of the object, therefore there arises a problem where the use is practically limited.

(3) Further, a floating mobile object in a stream of water or air is always affected by unknown hydrodynamic disturbances such as waves and tidal current or wind, and in addition, as shown in FIG. 11, the floating mobile object 10 in water is connected with an umbilical cable C (a feeder, a communication line or the like) from above the water, which often pulls the floating mobile object 10, besides it is not possible to model the unknown disturbances, and in addition it is difficult to predict influence of the disturbances, therefore such a model-based control technique is disadvantageous in that it cannot be fundamentally adapted to control of a floating mobile object.

Other prior known floating mobile object control techniques include, for example, feedback control of force at a joint of a manipulator as disclosed in Patent Document 1 and local feedback control of a thrust as disclosed in Non-patent Document 1.

According to the feedback control of a force at a joint of a manipulator in Patent Document 1, it is possible to activate thrusters before the main body of a floating mobile object is moved due to disturbances by the manipulator, thereby canceling any influence on the main body of the floating mobile object and preventing the main body of the floating mobile object from being moved by the disturbances by the manipulator.

Also, the thrusters used as effectors for controlling the position/velocity of the floating mobile object generates a thrust by taking advantage of a stream, and therefore a high nonlinearity caused by the stream is present between an input command to the thrusters and a thrust that is actually outputted. Such a nonlinearity results from various factors, and conventionally it is difficult to perform control with consideration of all of them (a problem of what is called a nonlinearity of an effector dynamic characteristic). However, according to the local feedback control of a thrust in Non-Patent Document 1, it is possible to prevent control performance for the floating mobile object from deteriorating due to the nonlinearity of effector dynamic characteristic.

While both of the above-described control techniques according to Patent Document 1 and Non-Patent Document 1 measure and feed back force partially, they do not cancel influence of waves and tidal current or wind which are the greatest disturbances to the floating mobile object.

In brief, neither of the above-described conventional arts realizes a floating mobile object control system capable of automatically compensating for disturbing influence even under disturbances caused by reaction, etc., of a robot arm and influence of unknown hydrodynamic disturbances such as waves and tidal current or wind to which a floating mobile object in water, air or the like is always subjected, thereby allowing the floating mobile object to stand still with high precision or track a target trajectory with high precision.

On the other hand, aside from the above-described problems, there is a below-described problem with inertial navigation, which is a prior known technique widely used for navigating a floating mobile object. Specifically, the inertial navigation uses an acceleration obtained from a floating mobile object, and in the case where the floating mobile object itself is large and heavy, a prior known acceleration sensor, which temporally converts an acceleration to a displacement and outputs the value of acceleration as an electric signal, is structurally unable to sense a minor change in the acceleration with high precision, therefore there arises a problem where a noticeable error is present between the acceleration value obtained from the sensor and an actual acceleration value. Such an error between the acceleration values considerably affects the accuracy of the inertial navigation itself, causing inconvenience of being unable to accurately guide the floating mobile object onto a desired trajectory.

[Patent Document 1] Japanese Laid-Open Patent Publication No. 5-119837

[Non-Patent Document 1] Kanaoka, Nakayama, Hayashi and Kawamura, "Thrust Local Feed-Back Control for Realization of High Speed and Precise Motion in Water", proceedings of the Robotics and Mechatronics Conference '03, the Japan Society of Mechanical Engineers, 2P1-2F-A6, 2003

DISCLOSURE OF THE INVENTION

Problems to be Solved by the Invention

Therefore, an objective of the present invention is to provide a floating mobile object control system capable of causing a floating mobile object to stand still in a predetermined position with high precision or track a target trajectory with high precision, even under disturbances caused by, for example, waves and tidal current or wind or disturbances caused by reaction, etc., of a robot arm attached to the floating mobile object.

In addition, an objective of the present invention is to provide a floating mobile object control system having a relatively simple structure and capable of accurately controlling the position, attitude, etc., of a floating mobile object.

Further, an objective of the present invention is to provide a floating mobile object acceleration sensing system capable of sensing an acceleration of a floating mobile object with high precision to such an extent that a minor change in acceleration can be sensed, regardless of size and weight of the floating mobile object or without depending on the capability of an acceleration sensor.

Solution to the Problems

The inventor of the present invention completed the invention based on findings that by dividing a floating mobile object into a main body part that can be considered as a single rigid body constituting a part of the floating mobile object and an effector part for generating a thrust for the floating mobile object, and providing a force/torque sensor at an only portion (a thrust transfer gate) that dynamically connects the main body part and the effector part, it is made possible to measure all forces and torques applied between the main body part and the effector part, because a value sensed by the force/torque sensor is a thrust fed from the effector part to the main body part, and directly control a thrust that is to be fed to the floating mobile object by feeding back the value, whereby it is possible to allow the floating mobile object to stand still in a predetermined position with high precision, or track a target trajectory with high precision, even under hydrodynamic disturbances caused by waves, tidal current, etc.

A control system for a floating mobile object of the present invention that can solve the above objectives is (1) a control system for a floating mobile object, in which the floating mobile object includes: a main body part that can be considered as a single rigid body constituting a part of the floating mobile object; an effector part for generating a thrust for the floating mobile object; and a thrust transfer gate for dynamically connecting the main body part and the effector part, the thrust transfer gate being adapted to be able to actually measure a thrust from the effector part acting on the main body part, the main body part includes acceleration measurement means capable of measuring an acceleration of the floating mobile object, and a thrust command to the effector part is obtained by using: an output from the acceleration measurement means of the main body part; and a measured thrust value from the thrust transfer gate.

Further, in the control system for a floating mobile object according to the present invention, (3) the thrust transfer gate includes force/torque measurement means capable of measuring a force/torque applied between the main body part and the effector part, and the thrust command to the effector part is obtained by using: an output from the force/torque measurement means of the thrust transfer gate; the output from the acceleration measurement means of the floating mobile object; and a target acceleration trajectory command obtained by converting an externally inputted target position/velocity trajectory command.

Note that in the case of applying a control system and an acceleration sensing system of the present invention to a floating mobile object for sliding on a slope as well as a floating mobile object for floating in three-dimensional space, which will be described in each embodiment and example below, it is necessary to compensate for influence of a gravitational acceleration, therefore it is required to provide inclination angle measurement means capable of measuring an inclination of the main body part as defined by the invention according to (7) below.

However, when applying the control system or acceleration sensing system of the present invention to a floating mobile object for floating in outer space where basically no gravity is applied or a floating mobile object for sliding on a horizontal plane for which it is not necessary to consider any inclination or it is possible to ignore any inclination, the inclination angle measurement means as defined by the invention according to the above (1) or (3), or the next-described (2) or (4) is not required. The same can be said of the invention according to (5) or (6) below to which the notion of a virtual thrust transfer gate system is applied, and in the case of applying a control system of the present invention, which employs the notion of the virtual thrust transfer gate system, to a floating mobile object for floating in three-dimensional space or the like, it is required to provide inclination angle measurement means capable of measuring an inclination of the floating mobile object as defined by the invention according to (6) below.

Similarly, a control system for a floating mobile object of the present invention that can solve the above objectives is (2) a control system for a floating mobile object, in which the floating mobile object includes: a main body part that can be considered as a single rigid body constituting a part of the floating mobile object; an effector part for generating a thrust for the floating mobile object; and a thrust transfer gate for dynamically connecting the main body part and the effector part, the thrust transfer gate being adapted to be able to actually measure a thrust from the effector part acting on the main body part, the main body part is dynamically connected only to the thrust transfer gate, the main body part being adapted to receive substantially all forces acting thereon via the thrust transfer gate, and a thrust command to the effector part is obtained by using a measured thrust value from the thrust transfer gate.

Note that in a typical example where the main body part is dynamically connected only to the thrust transfer gate and adapted to receive substantially all forces acting thereon via the effector part and the thrust transfer gate, the effector part is in the form of a shell enclosing the main body part.

However, such a configuration is an extreme example, and the main body part is not necessarily sealed in an effector part having the form of a shell. In other words, it is only required to structure the invention defined in (2) such that the main body part is not directly subjected to disturbances such as water pressure or intense wind pressure or other external forces, and if the main body part contained in a floating mobile object for sliding on water or ground, for example, is exposed to air, it is merely an ignorable problem that does not cause any particular inconvenience in application of the invention according to (2).

Thus, it is understood that the invention defined in (2) is not limited to the configuration as shown in FIG. 3.

Further, in the control system for a floating mobile object according to the present invention as described in (2) above, (4) the thrust transfer gate includes force/torque measurement means capable of measuring a force/torque applied between the main body part and the effector part, and the thrust command to the effector part is obtained by using: an output from the force/torque measurement means of the thrust transfer gate; and a target acceleration trajectory command obtained by converting an externally inputted target position/velocity trajectory command.

Further, the present invention is directed to (5) a control system for a floating mobile object, in which the floating mobile object includes acceleration measurement means capable of an acceleration of the floating mobile object, the floating mobile object is arithmetically divided into: a virtual main body part that can be considered as a single rigid body constituting a part of the floating mobile object; a virtual effector part for generation a thrust for the floating mobile object; and a virtual thrust transfer gate for virtually connecting the virtual main body part and the virtual effector part, the virtual thrust transfer gate being adapted to be able to estimate a thrust from the virtual effector part acting on the virtual main body part based on an output from the acceleration measurement means, and a thrust command to the virtual effector part is obtained by using an estimate thrust value from the virtual thrust transfer gate.

In addition, in the control system for a floating mobile object according to the present invention as described in (5) above, (6) the virtual thrust transfer gate includes force/torque estimation means capable of estimating a force/torque applied between the virtual main body part and the virtual effector part, and the thrust command to the virtual effector part is obtained by using: an output from the force/torque estimation means of the virtual thrust transfer gate; and a target acceleration trajectory command obtained by converting an externally inputted target position/velocity trajectory command.

In addition, in a control system based on the control system for a floating mobile object as described in (1) through (6) above, which is configured to be able to eliminate gravitational influence as described above, (7) the main body part or the virtual main body part additionally includes inclination angle measurement means capable of measuring an inclination of the floating mobile object, and the thrust command to the effector part or the virtual effector part is obtained by additionally using an output from the inclination angle measurement means.

In addition, the present invention is directed to a control system for a floating mobile object intended to offer higher performance by additionally provided with a thrust transfer gate system according to (1) through (7) above and a prior known position/velocity control capability, in which (8) the floating mobile object additionally includes position/velocity measurement means capable of measuring a position or a velocity of the floating mobile object, and the thrust command to the effector part or the virtual effector part is obtained by additionally using an output from the position/velocity measurement means and an externally inputted target position command or target velocity command.

Note that as described below, in the above control system for a floating mobile object according to the present invention, control of the floating mobile object is carried out in two stages: a "thrust planning part", which issues a command after calculating a thrust that should be applied from the thrust transfer gate to the main body part in order to realize a target trajectory, and a "thrust control part", which directly drives the effector part, so as to realize a command thrust at the thrust transfer gate, by feeding back the current thrust value at the thrust transfer gate to the effector part.

In the present invention, the above mechanism design and control technique are collectively referred to as the "thrust transfer gate system". The thrust transfer gate system is mainly embodied in the following three forms:

i) the main body part is exposed to the exterior, i.e., the main body part is directly affected by disturbances such as water pressure or intense wind pressure or other external forces, and a thrust transfer gate is further provided [see the below-described first instance of a first embodiment];

ii) a thrust transfer gate is provided, and in order not to subject the main body part directly to disturbances such as water pressure or intense wind pressure or other external forces, the main body part is dynamically connected only to the thrust transfer gate and adapted to receive substantially all forces acting thereon via the effector part and the thrust transfer gate (e.g., the main body part is covered and sealed in the effector part) [see the below-described second instance of the first embodiment]; and iii) the floating mobile object is arithmetically divided into the main body part and the effector part without changing any hardware component of the floating mobile object, and an inertia matrix for the main body part is previously prepared in a computer, and used together with an output of an acceleration sensor provided in the floating mobile object and, if necessary, an output from an inclination angle sensor provided in the floating mobile object, to obtain a thrust command to the effector part [see the below-described third instance of the first embodiment for a virtual thrust transfer gate].

In i) and ii), achieved control performance is high, although it is required to change the hardware design of the floating mobile object due to the thrust transfer gate system, and the force/torque sensor is required at the thrust transfer gate.

In iii), on the other hand, control performance is low compared to the methods in i) and ii), but it is not required to change the hardware design of the floating mobile object, and by adding the acceleration sensor and, if necessary, the inclination angle sensor to an existing floating mobile object, it is made possible to utilize the thrust transfer gate system, thereby improving the control performance.

Particularly, a known inertial navigation device, which is currently mounted in aircrafts, etc., can also be used as the acceleration sensor, inclination angle sensor or main body part position/velocity sensor used in the present invention, and by using this, it is made possible to realize in an increase in speed and precision compared to existing control, without making any hardware modification.

In addition, the present invention is directed to a floating mobile object acceleration sensing system for sensing an acceleration of a floating mobile object, in which the floating mobile object includes: a main body part that can be considered as a single rigid body constituting a part of the floating mobile object; an effector part for generating a thrust for the floating mobile object; and a thrust transfer gate for dynamically connecting the main body part and the effector part, the thrust transfer gate being adapted to be able to actually measure a thrust from the effector part acting on the main body part, the thrust transfer gate includes force/torque measurement means capable of measuring a force/torque applied between the main body part and the effector part, the main body part is dynamically connected only to the thrust transfer gate, the main body part being adapted to receive substantially all forces acting thereon via the effector part and the thrust transfer gate, and an estimated acceleration value for the main body part is obtained by using an output from the force/torque measurement means from the thrust transfer gate.

Also, in the floating mobile object acceleration sensing system according to the present invention, the main body part includes inclination angle measurement means capable of measuring an inclination of the main body part, and the estimated acceleration value for the main body part is obtained by additionally using an output from the inclination angle measurement means of the main body part.

According to the present invention, it is possible to provide a system structure capable of allowing a floating mobile object to stand still in a predetermined position with high precision, or track a target trajectory with high precision, even under disturbances caused by waves and tidal current or wind or disturbances caused by reaction, etc., of a robot arm attached to the floating mobile object, thereby making it possible to control the floating mobile object at higher speed with higher precision.

Note that terms used for describing the present invention are defined below.

The term "floating mobile object" is meant to indicate various mobile objects for floating in water, air, outer space, and so on. Also, mobile objects for sliding on a plane or rails fall within the notion of the floating mobile object.

Concrete examples falling within the notion of the "floating mobile object" as defined by the present invention are listed below by environmental type:

(1) outer space: space robots, spaceships, artificial satellites, etc.;

(2) air: aerial robots, aircrafts, helicopters, airships, etc.;

(3) underwater: underwater robots, submersibles, etc.;

(4) overwater: watercrafts, air-cushion vehicles, etc.;

(5) ground: cars, trains, air-cushion vehicles, other mobile objects for sliding on ice or snow, such as sleds and snowmobiles, etc.

As for ground vehicles such as cars, it is understood that they can be the "floating mobile object" when their wheels are sliding, for example. Accordingly, by applying the present invention to, for example, a car, it is possible to control the vehicle similarly regardless of whether its wheels are sliding or not.

However, when the wheels are sliding, thrust transfer means composed of existing engine and tires cannot function. In view of this, it is understood from each of the following descriptions that when applying the present invention under the above circumstance, it is preferred that the ground vehicle is provided with any other thrust transfer means (various types of thrusters or the like).

The term "main body part" is meant to indicate a physical structure that can be considered as a single rigid body constituting a part of the floating mobile object. In principle, the main body part does not include any mechanically moving part. Even when any mechanically moving part is included, no problem is caused if its influence is as small as it can be ignored, and when it cannot be ignored, still it is possible to cancel the influence if it is predictable.

Note that in the invention that corresponds to the below-described third instance of the first embodiment according to the present invention to which the notion of the virtual thrust transfer gate system is applied, the rigid distinction between the main body part and the effector part is merely for convenience, users may be allowed to use their judgment to determine which part should be defined as the main body part. Accordingly, when actually carrying out the invention that corresponds to the below-described third instance of the first embodiment, the main body part may be defined as constituting the most part of the mass of the floating mobile object, or on the contrary, the main body part may be defined as an object additionally provided in a part of the floating mobile object (e.g., a weight of about several kilograms).

Also, in the inventions that correspond to the below-described first and second instances of the first embodiment to which the notion of the virtual thrust transfer gate system is not applied, whether or not the main body part and the effector part are connected by the below-described thrust transfer gate is the only judgment criterion for rigidly distinguishing between them, and there is no limitation on proportion of the main body part in the floating mobile object so long as such criterion is satisfied.

Thus, in the present invention, the main body part is not limited to a physical structure composed of a single rigid body constituting the most part of the mass of the floating mobile object.

The term "effector part" is meant to indicate a physical structure for generating a thrust for the floating mobile object. All thrust generation means (effectors) for controlling the position, velocity, etc., of the floating mobile object are included.

The term "dynamically connected" is meant to indicate a state where some kind of interaction of force is taking place between objects that are referred to thereby. In most cases, they are mechanically connected, but cases where, even when not mechanically connected, non-contact interaction of force is applied by, for example, electromagnetic force, are also included.

On the other hand, the term "mechanically divided" is meant to indicate a case where no interaction of force is applied between objects that are referred to thereby.

The term "thrust transfer gate" is meant to indicate the only portion that dynamically connects the main body part and the effector part and includes a sensor capable of actually measuring all forces and torques applied between the main body part and the effector part, whereby it is possible to actually measure all thrusts from the effector part acting on the main body part.

The term "virtual thrust transfer gate" is meant to indicate a thrust transfer gate, which is virtually provided in the floating mobile object and therefore is physically not present therein, and in an existing floating mobile object, which is arithmetically divided, for convenience's sake, into a main body part and an effector part, it is adapted to be able to estimate, based on a measured acceleration value for the main body part, forces and torques applied between the main body part and the effector part, i.e., all thrusts from the effector part acting on the main body part.

Note that when only the term "thrust transfer gate" is used herein, the "virtual thrust transfer gate" is also included unless otherwise specified.

The term "thrust estimated value at the virtual thrust transfer gate" is meant to indicate a virtual value obtained by calculation based on a value measured at the virtual thrust transfer gate by an acceleration sensor (a main body part acceleration measured value), rather than a value actually measured at a physically existing thrust transfer gate.

The term "thrust planning part" is meant to indicate a part or function of a computer that issues a command to the thrust control part after calculating a desired thrust that should be applied at the thrust transfer gate from the effector part to the main body part, in order to realize a target trajectory.

The term "thrust control part" is meant to indicate a part or function of the computer that outputs a thrust command to an effector, so as to realize a desired target thrust at the thrust transfer gate, by feeding back a measured or estimated thrust value at the thrust transfer gate.

The term "target thrust" is meant to indicate a thrust that should be applied at the thrust transfer gate from the effector part to the main body part, in order to realize a target trajectory.

The "target acceleration" is meant to indicate an acceleration obtained by differential calculation based on a desired target trajectory or a target velocity.

The term "thrust force transfer gate system (TTGS)" is meant to indicate a control system, which includes the thrust planning part and the thrust control part, and controls a floating mobile object provided with a thrust force transfer gate.

The term "effector thrust force characteristic" is meant to indicate the relationship between an effector thrust force command, which is inputted to an effector such as a thruster, and an effector thrust force, which is actually outputted. Note that the effector such as a thruster is generally generates a thrust force by means of a stream, the effector thrust force characteristic includes complicated dynamics affected by hydrodynamic resistance/lift, in addition to mechanical dynamics of the effector itself.

EFFECT OF THE INVENTION

Conventionally, a thrust of a thruster is controlled by feeding back a sensor information concerning the position/velocity of a floating mobile object, while the present invention directly feeds back a generated thrust to control a thrust of an effector, thereby realizing a high-speed response according to a principle. Thus, the above-mentioned sensing delay problem is alleviated. Particularly, when the thrust force transfer gate is provided as hardware (see, for example, the first and second instances of the first embodiment), the influence of sensing delay is not increased even if the mass of the floating mobile object is large or the thrust of the effector is low.

In a floating mobile object control system of the present invention, the thrust of the effector is controlled by a thrust control part feeding back a thrust at the thrust transfer gate as described below. This realizes the above-mentioned high-speed response. At the same time, by applying to the thrust control part an existing control technique (e.g., sliding mode control), which offers robustness to nonlinearities, it is possible to suppress a nonlinearity of an effector dynamic characteristic, thereby preventing adverse influence on control performance. Conventionally, linearization of the effector dynamic characteristic is performed by feedforward compensation based on a dynamic characteristic model of the effector, however, it is significantly time-consuming and imposes a heavy computation load. The floating mobile object control system of the present invention realizes the linearization by thrust feedback, which does not necessarily use the dynamic characteristic model, and therefore it is possible to construct a control system with less computation load.

In addition, in the conventional art, an unignorable delay in time occurs during a period of time since sensing is carried out as described above until a thrust command is actually fed to the thruster, and as a result, in order to keep the floating mobile object on a predetermined trajectory, it is inevitable, in most cases, to drive the floating mobile object more than necessary, for example, because it is required to repeatedly correct an overshoot and an undershoot a considerable number of times. The task of suitably performing gain tuning of the control system is extremely significant and requires experience in addition to labor and time.

On the other hand, according to the present invention, it is possible to feed a thrust that is actually required by the thruster in a timely manner, and therefore it is possible to avoid driving the thruster and the floating mobile object more than necessary. In addition, the floating mobile object is not caused to consume thruster drive energy more than necessary, whereby it is possible to achieve an effect of reducing energy consumption of the floating mobile object.

Also, in the floating mobile object control system of the present invention, influence of unknown disturbances can be immediately sensed as thrust error at the thrust transfer gate, and compensated for by local feedback control of the thrust control part, and therefore levels above the thrust planning part are not required to take the disturbances into consideration. Specifically, by only requiring the thrust planning part to issue a command such as "stand still" or "go straight", it is possible to automatically compensate for the influence of the disturbances in the thrust control part, thereby realizing a desired operation that is previously planned. Also, it is possible to realize a high-speed response compared to a conventional case where the influence of the disturbances is sensed by position/velocity error.

On the other hand, according to a floating mobile object acceleration sensing system of the present invention, an estimated acceleration value for the main body part can be obtained by using a previously identified inertia matrix of the main body part, an output from the force/torque sensor from the thrust transfer gate, and, if necessary, an output from the inclination angle sensor of the main body part, and therefore it is possible to sense an acceleration of the floating mobile object with high precision to such an extent that a minor change in acceleration can be sensed, regardless of size and weight of the floating mobile object or without depending on the capability of the acceleration sensor, and also possible to, when guiding the floating mobile object by inertial navigation, accurately guide the floating mobile object onto a desired trajectory.

Hereinafter, the present invention will be described in more detail.

DESCRIPTION OF THE REFERENCE CHARACTERS

Figure 1:
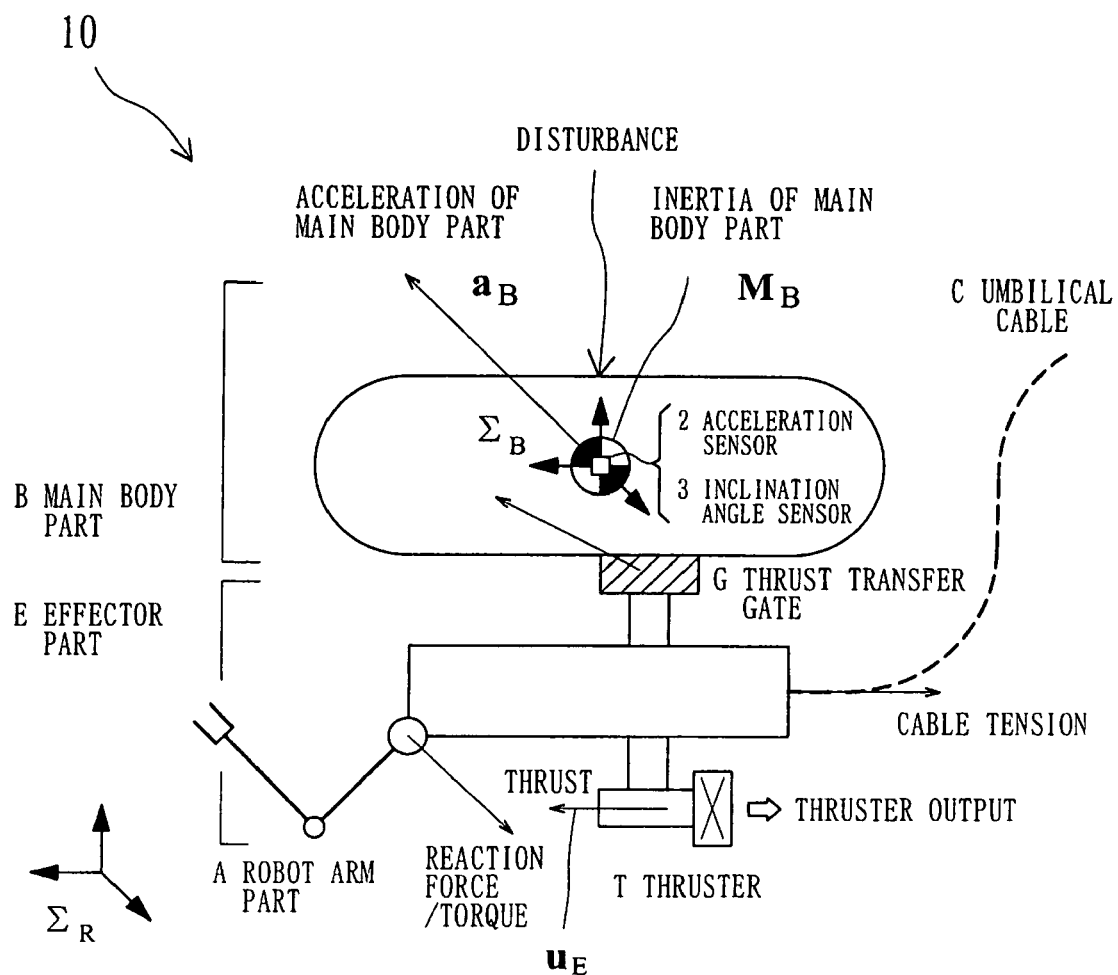
FIG. 1 is a schematic diagram illustrating an exemplary configuration of the floating mobile object to which a control system of the present invention is applied.

A robot arm part
B main body part
B1 statics of main body part
B2 inertia of main body part
B2' inertia of main body part
B3 inertia of main body part
B4 integration
C cable
E effector part
E1 effector thrust characteristic
E2 statics of effector part
G thrust transfer gate
G' virtual thrust transfer gate
H operator
P computer
P1 differential calculus
P2 thrust planning part P3 thrust control part
P4 position control/velocity control
S pressure hull
T thruster
1 control system
2 acceleration sensor
3 inclination angle sensor
4 position/velocity sensor
5 cavity
10 floating mobile object
11 subtraction circuit
12 thruster control circuit
13 sensor
14 effector thrust characteristic
15 floating mobile object dynamics
16 reaction force/torque of robot arm
17 adding circuit
18 thruster/robot arm control circuit
19 joint actuator
20 floating mobile object main body/robot arm complex system dynamics
21 subtraction circuit

EMBODIMENTS FOR CARRYING OUT THE INVENTION

First Embodiment

Hereinafter, an embodiment of the present invention and the action thereof will be described with reference to FIGS. 1 through 7 in relation to an underwater robot, which typifies a target for which the present invention is carried out. The underwater robot is nothing less than a floating mobile object for floating in three-dimensional space, and in the case of applying a control system of the present invention to the underwater robot, it is necessary to compensate for influence of a gravitational acceleration, therefore it is required to provide inclination angle measurement means capable of measuring an inclination of a main body part as defined by the invention according to (7) above. The same can be said of the invention according to (5) above to which the notion of a virtual thrust transfer gate system is applied, and in the case of applying a control system of the present invention, which employs the notion of the virtual thrust transfer gate system, to a floating mobile object for floating in three-dimensional space or the like, it is required to provide inclination angle measurement means capable of measuring an inclination of the floating mobile object as defined by the invention according to (7) above. The inventions according to (1) and (3) or (2) and (4) above further including inclination angle measurement means, which is the invention according to (7) above, correspond to first and second cases of a first embodiment, respectively, and they also correspond to the below-described examples 1 and 2, respectively. The inventions according to (5) and (6) above correspond to a third case of the first embodiment and the below-described example 3.

It is fully understood from the above definition section and the below-described examples that the application target is not limited to the underwater robot. In addition, the underwater robot is not limited to a typical example used for deep sea exploration as illustrated in the drawings, and relatively small robots, which can be used for lifesaving or oil field exploration, fall within the category of the underwater robot.

Figure 2:
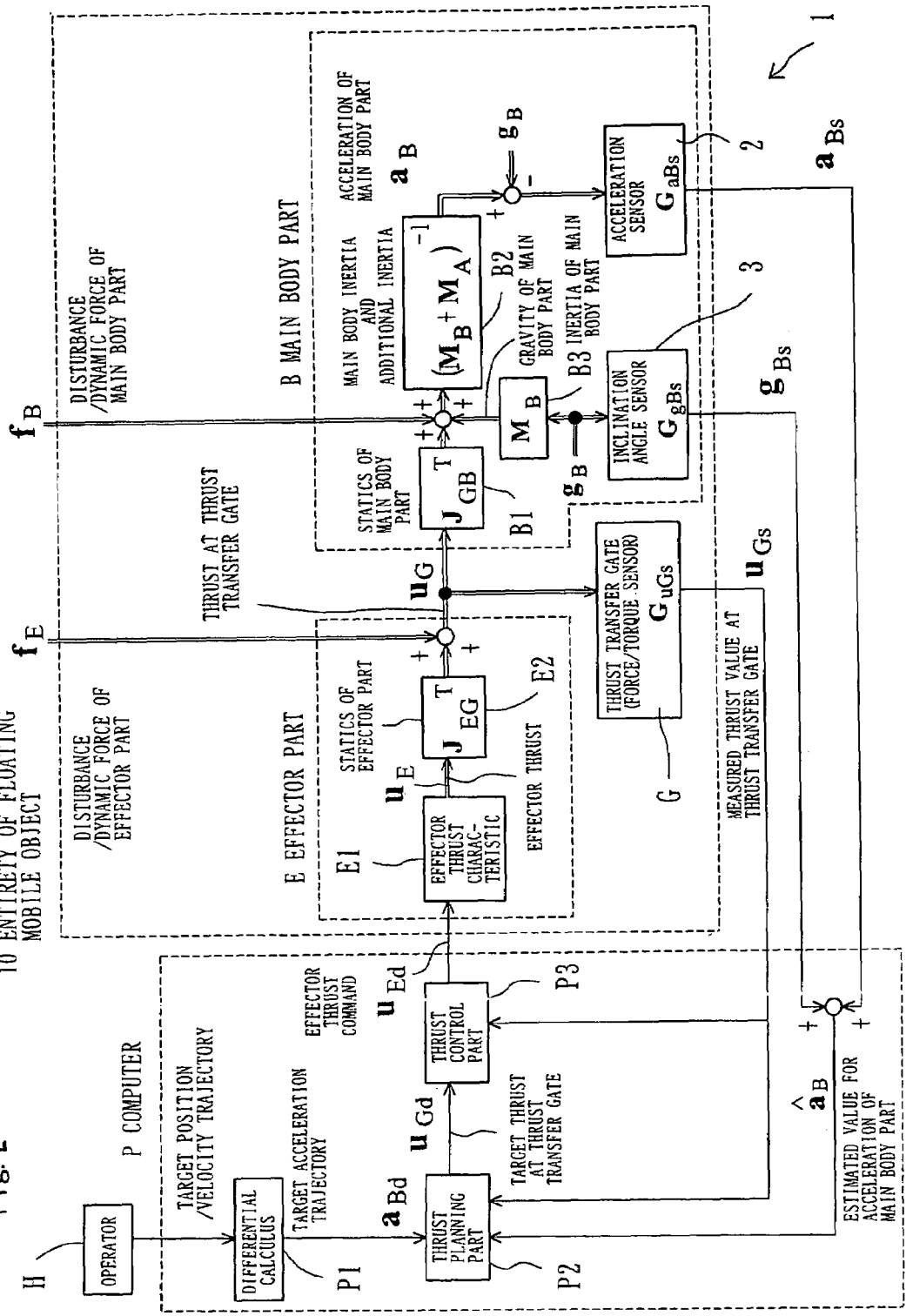
FIG. 2 is a block diagram illustrating an exemplary configuration of the control system of the present invention.
Figure 3:
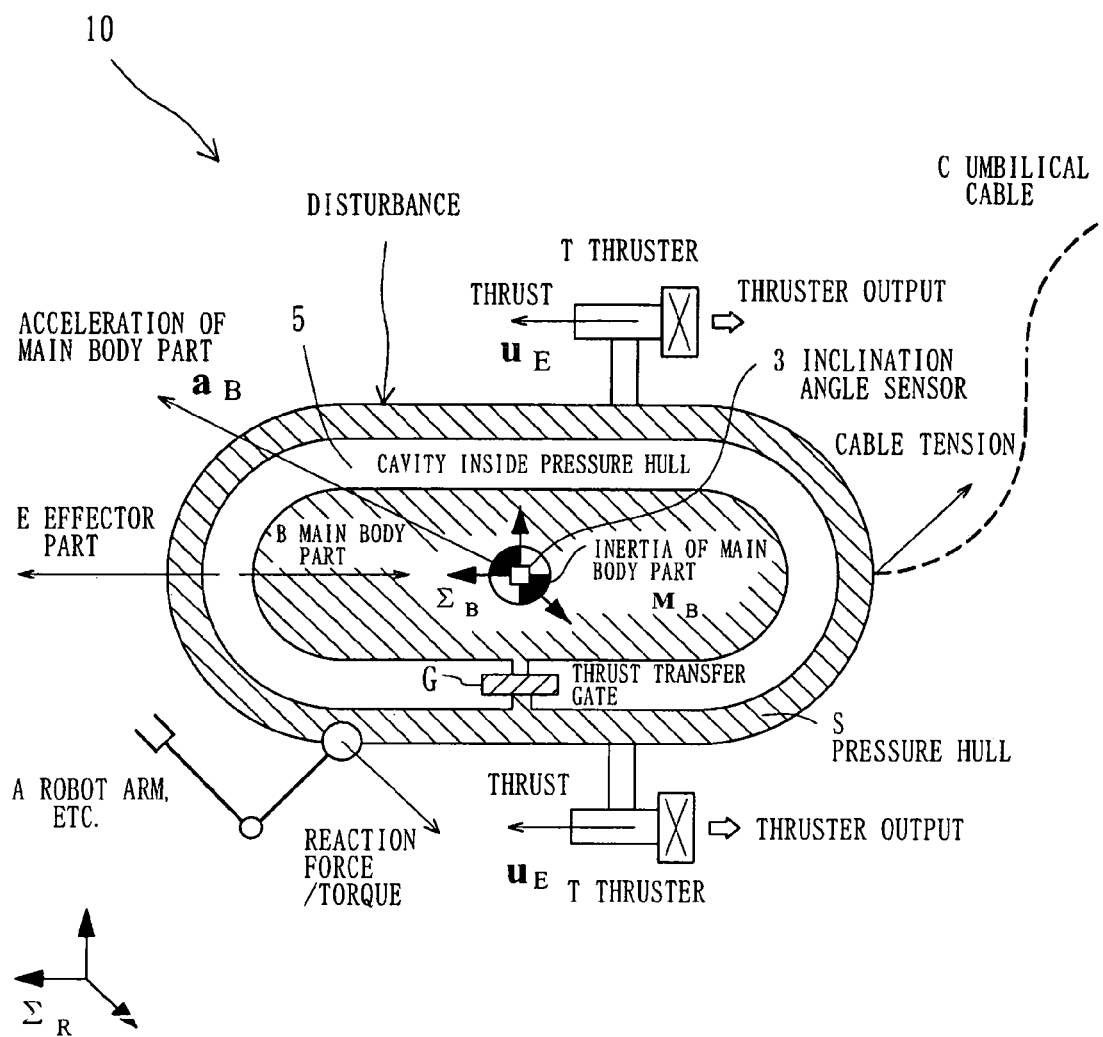
FIG. 3 is a schematic diagram illustrating an another exemplary configuration of the floating mobile object to which the control system of the present invention is applied.
Figure 4:
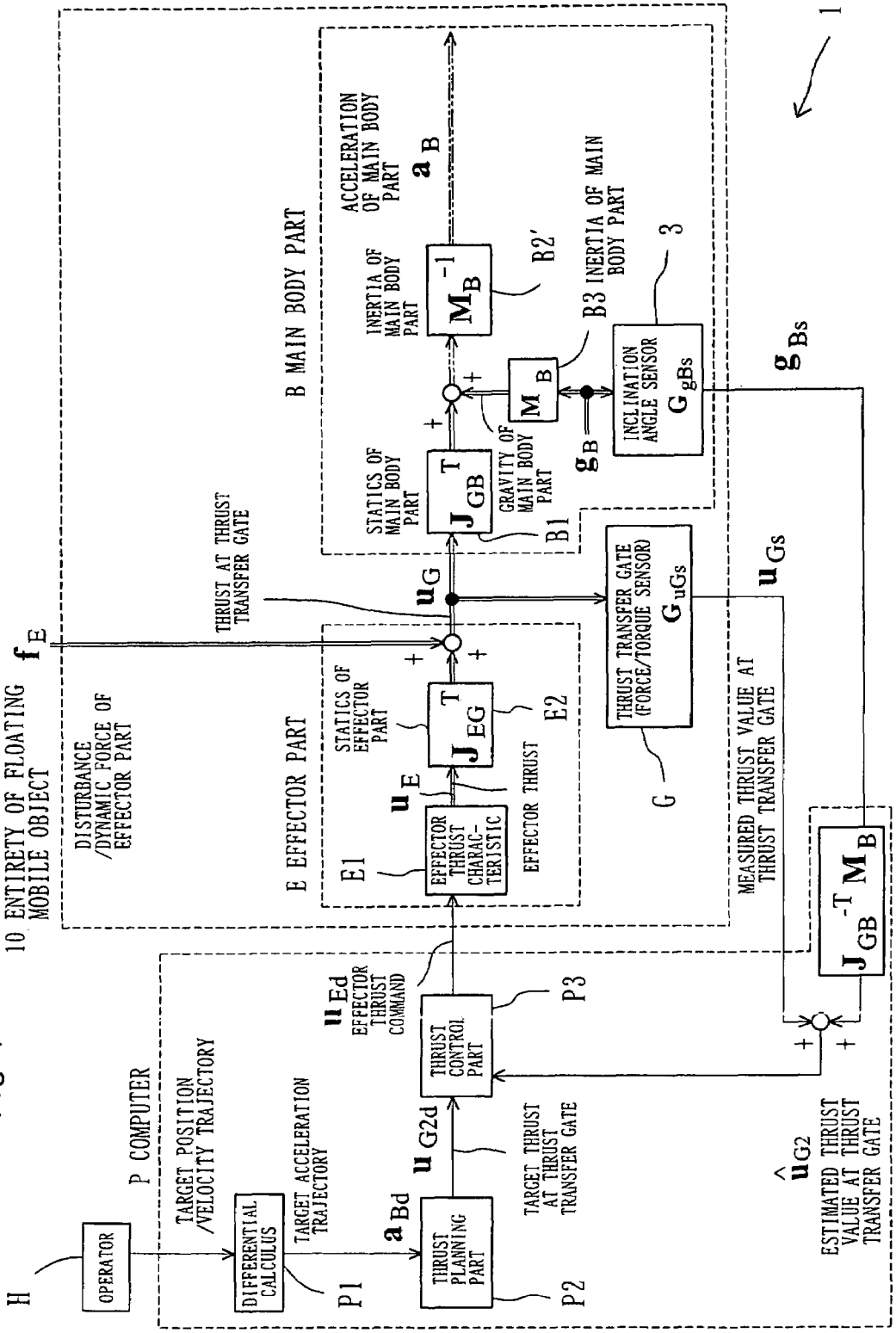
FIG. 4 is a block diagram illustrating an another exemplary configuration of the control system of the present invention.
Figure 5:
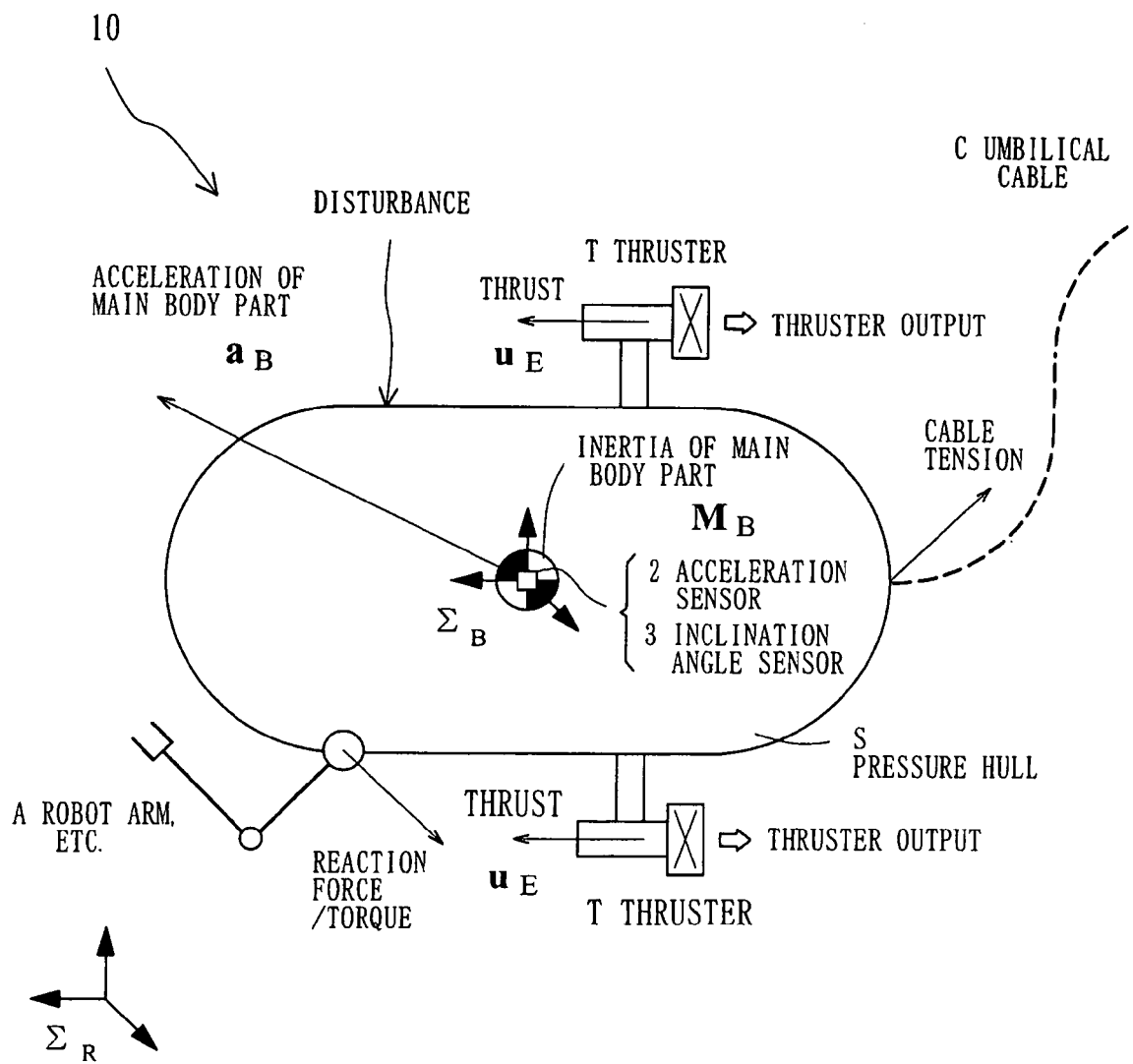
FIG. 5 is a schematic diagram illustrating an another exemplary configuration of the floating mobile object to which the control system of the present invention is applied.
Figure 6:
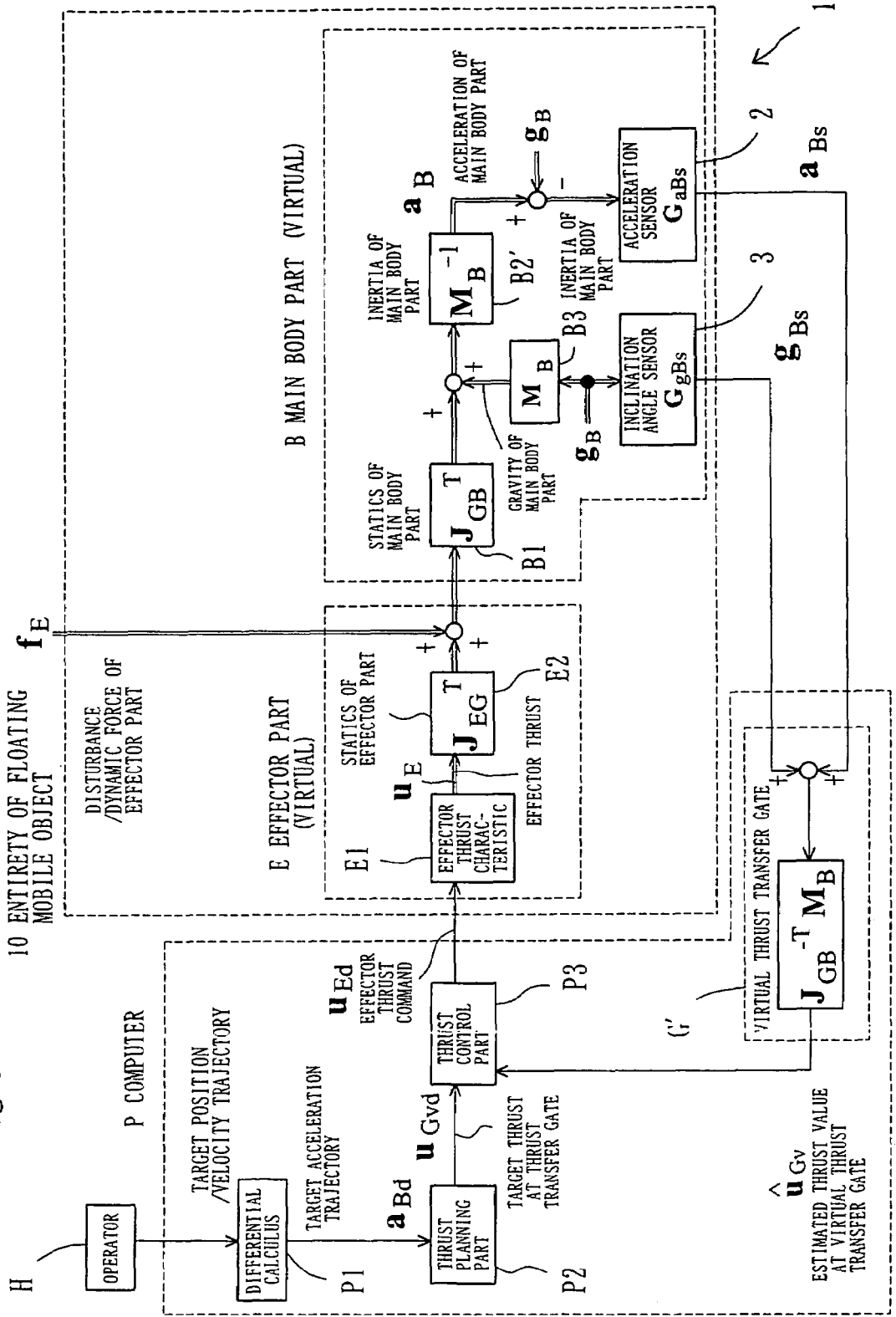
FIG. 6 is a block diagram illustrating an another exemplary configuration of the control system of the present invention.
Figure 7:
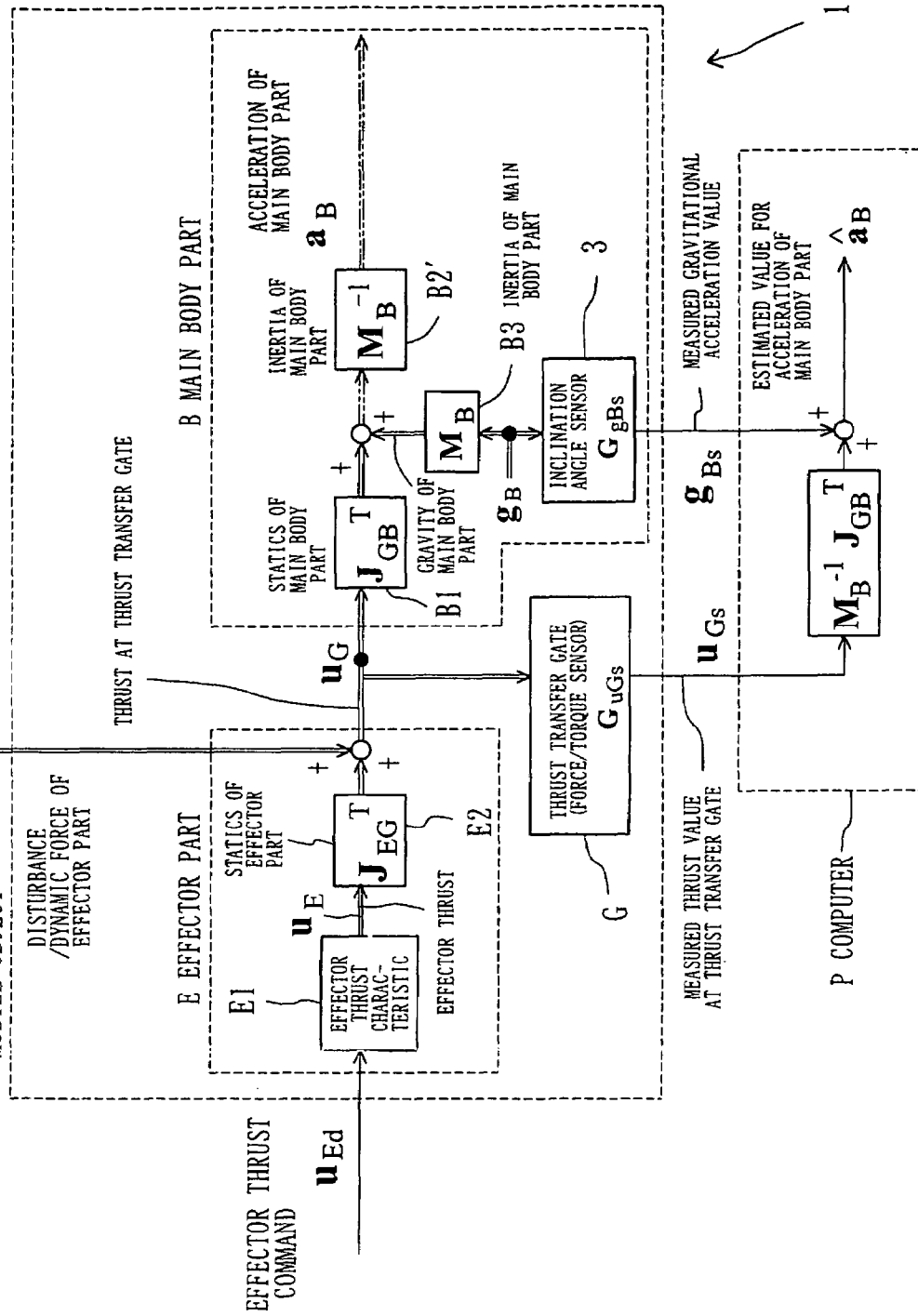
FIG. 7 is a block diagram illustrating a second embodiment of the control system of the present invention.

Here, FIG. 1 is a schematic diagram illustrating an exemplary configuration of the floating mobile object to which a control system of the present invention is applied, and FIG. 2 is a block diagram illustrating an exemplary configuration of the control system of the present invention. FIGS. 3 and 5 are schematic diagrams each illustrating an another exemplary configuration of the floating mobile object to which the control system of the present invention is applied, and FIGS. 4 and 6 are block diagrams each illustrating an another exemplary configuration of the control system of the present invention. FIG. 7 is a block diagram illustrating a second embodiment of the control system of the present invention.

In FIGS. 1 through 7 above, the same elements as those illustrated in FIGS. 11 through 14 illustrated above are described with the same reference characters.

In FIGS. 2, 4, 6 and 7, a thin solid line extending between blocks represents a signal. In contrast, a double line extending between blocks within a floating mobile object 10 represents a phenomenon (dynamic transformation action or the like) taking place as a physical action in the floating mobile object 10.

Incidentally, in the following detailed description of the present invention, a reference coordinate system fixed in the absolute location of an inertial system is denoted by $\Sigma_R$, and a main body coordinate system having the origin at the gravitational center position of the floating mobile object and fixed on the main body part of the floating mobile object is denoted by $\Sigma_B$. Unless otherwise specified, vectors and matrices are indicated by expressions as they are viewed from the main body coordinate system $\Sigma_B$. Further, the floating mobile object is present in m-dimensional space (m≦6), and an effector of the floating mobile object is capable of generating an n-degree-of-freedom thrust (m≦n).

First Instance

The configuration of a first instance of a thrust transfer gate system according to the present embodiment is as shown in FIGS. 1 and 2. FIG. 1 is a schematic diagram of a floating mobile object, and FIG. 2 is a block diagram of a control system.

In the present instance, a floating mobile object 10 is dynamically divided into a main body part B and an effector part E, and a thrust transfer gate G is provided as hardware between the main body part B and the effector part E. In addition, the main body part B is provided with an acceleration sensor 2 and an inclination angle sensor 3, and the thrust transfer gate G is provided with a force/torque sensor. In the present instance, the main body part B and the thrust transfer gate G are configured to be exposed to exterior similar to the effector part E.

Note that the below-described inertia matrix $M_B$ of the main body part B and $J_{GB}$ and $J_{EG}$ representing geometric constructions of the floating mobile object 10 are given as previously measured known matrices.

Hereinbelow, the configuration of the present instance is described in detail.

Referring to FIG. 2 for the interiors of the main body part B and the effector part E, an equation of motion representing physical dynamics of the floating mobile object can generally be written as the following equation.

[Expression 1]

$$J_{GB}{}^T u_G(t) = M_B(a_B(t) - g_B(t)) + M_A a_B(t) - f_B(t) \quad (1)$$

$$u_G(t) = J_{EB}{}^T(t) u_E(t) + f_E(t) \quad (2)$$

Equation (1) represents the main body part, and Equation (2) represents the effector part. Each variable is defined as follows:

$a_B(t) \in R^m$: an acceleration of the main body part (gravitational center) of the floating mobile object;

$g_B(t) \in R^m$: a gravitational acceleration applied to the main body part (gravitational center) of the floating mobile object;

$u_G(t) \in R^m$: a thrust from the effector part acting on the main body part at the thrust transfer gate;

$J_{GB} \in R^{m \times m}$: a Jacobian matrix for transformation from the velocity of the main body part to the velocity of the thrust transfer gate;

$M_B \in R^{m \times m}$: an inertia matrix of the main body part of the floating mobile object;

$M_A \in R^{m \times m}$: an additional inertia matrix for the main body part of the floating mobile object due to influence of a stream;

$f_B(t) \in R^m$: a thrust (an external force such as tidal current, waves or wind) acting on the main body part of the floating mobile object, which cannot be expressed by other terms in Equation (1);

$u_E(t) \in R^n$: a thrust generated by each effector;

$J_{EG}(t) \in R^{m \times m}$: a Jacobian matrix for transformation from the velocity of the thrust transfer gate to the velocity of each effector;

$f_E(t) \in R^m$: a thrust (e.g., an inertia force of an effector part, or external force such as tidal current, waves or wind) from the effector part of the floating mobile object acting on the thrust transfer gate, which cannot be expressed by other terms in Equation (2), and is indicated by an expression as it is viewed from the thrust transfer gate.

Note that the thrust transfer gate system 1 of the present instance is structured such that the thrust transfer gate G is fixed on the single rigid body structure of the main body part B. Thus, the Jacobian matrix $J_{GB}$ and the inertia matrix $M_B$ are constant matrices.

Described next is a thrust planning part of the present instance.

A target thrust $u_{Gd}(t)$ at the thrust transfer gate G required for realizing a target acceleration $a_{Bd}(t)$ of the main body part B as indicated by the block of a thrust planning part P2 within a computer P in FIG. 2 is defined by the following equation.

[Expression 2]

$$u_{Gd}(t) = u_{Gs}(t) + J_{GB}^{-T} M_B(a_{Bd}(t) - \hat{a}_B(t)) \quad (3)$$

Note that $a_{Bd}(t)$ and $\hat{a}_B(t)$ [an m-dimensional vector] are respectively a target value and an estimated value for a main body acceleration $a_B(t)$, and $u_{Gd}(t)$ [an m-dimensional vector] is a target value for a gate thrust $u_G(t)$, and $u_{Gs}(t)$ [an m-dimensional vector] is a value of $u_G(t)$ measured by a force/torque sensor provided at the thrust transfer gate.

Here, by controlling $u_G(t)$ with a thrust control part denoted by reference character P3 within the computer P in FIG. 2, such that $u_{Gd}(t)$ is realized by thrust feedback, it is possible to construct a feedback control system for controlling a thrust by thrust feedback with less delay.

A control technique offering superior robustness to non-linear systems should be applied to the thrust control part P3 in order to suppress an unknown nonlinearity of an effector thrust characteristic denoted by reference character E1 within an effector part E in FIG. 2 and a dynamic characteristic of the effector part such as disturbances or dynamic force $f_E(t)$ against the effector part. For example, by applying existing sliding mode control, the thrust control part P3 can be constructed as below.

In the thrust control part P3 of the present instance, a thrust command $u_{Ed}(t)$ to the effector required for realizing the target thrust $u_{Gd}(t)$, is defined as in the following equation.

[Expression 3]

$$s_G(t) = J_{EG}^{+T}(t)\left\{(u_{Gs}(t) - u_{Gd}(t)) + T_G \frac{d}{dt} u_{Gs}(t)\right\} \quad (4)$$

$$[u_{Ed}(t)]_i = \begin{cases} u_{Edimax} & ([s_G(t)]_i < 0) \\ 0 & ([s_G(t)]_i = 0) \\ u_{Edimin} & ([s_G(t)]_i > 0) \end{cases} \quad (5)$$

Each variable is defined as follows:

$s_G(t) \in R^n$: a switch function for sliding mode control;

$T_G \in R$: a time constant of a first-order lag system constrained by switch function;

$u_{Ed}(t) \in R^n$: a command thrust to each effector;

$u_{Edi\,max} \in R$: a maximum commandable thrust to an i-th component of the effector thrust;

$u_{Edi\,min} \in R$: a minimum commandable thrust to the i-th component of the effector thrust;

$[*]_i \in R$: an i-th component of a vector *

$*^{+T}$: transposition of a pseudo inverse matrix of a matrix *.

In the present instance, values required for feedback to the thrust planning part and the thrust control part are $u_{Gs}(t)$ and $\hat{a}_B(t)$. As the gate thrust measured value $u_{Gs}(t)$, a value measured by the force/torque sensor provided at the thrust transfer gate is used as it is.

Described below is a method for estimating the acceleration $a_B(t)$ of the main body part. To examine a sensor characteristic and a thrust control characteristic, the following discussion is given mainly in relation to a frequency domain.

First, a measured acceleration value $a_{Bs}(t)$ [an m-dimensional vector] obtained by the acceleration sensor of the main body part denoted by reference character 2 within the main body part B in FIG. 2 is given as below. The measured value includes a gravitational acceleration, and therefore cannot be used as an estimated value for the main body acceleration $a_B(t)$ without any change.

[Expression 4]

$$a_{Bs}(s) = G_{aBs}(s)(a_B(s) - g_B(s)) \quad (6)$$

Note that *(s) is Laplace transform of the vector or matrix *(*(s)=L[*(t)]), and $G_{aBs}(s)$ is a transfer function matrix with m rows and m columns representing an acceleration sensor characteristic of the main body part.

Similarly, a measured value $g_{Bs}(t)$ [an m-dimensional vector] for a gravitational acceleration obtained by the inclination angle sensor of the main body part is given as below.

[Expression 5]

$$g_{Bs}(s) = G_{gBs}(s) g_B(s) \quad (7)$$

Note that $G_{gBs}(s)$ is a transfer function matrix with m rows and m columns representing an inclination angle sensor characteristic of the main body part.

Similarly, a gate thrust measured value $u_{Gs}(t)$ [an m-dimensional vector] obtained by the thrust transfer gate is given as below.

[Expression 6]

$$u_{Gs}(s) = G_{uGs}(s) u_G(s) \quad (8)$$

Note that $G_{uGs}(s)$ is a transfer function matrix with m rows and m columns representing a force/torque sensor characteristic of the thrust transfer gate.

Described next is estimation of the main body acceleration $a_B(t)$ in the present instance.

An estimated value $a_B(t)$ for the main body acceleration $\hat{a}_B(t)$ is defined as below.

[Expression 7]

$$\hat{a}_B(t) = a_{Bs}(t) + g_{Bs}(t) \qquad (9)$$

Here, consider the validity of the above estimation of the main body acceleration. By applying the Laplace transform to equation (9) and substituting equations (6) and (7), $$\hat{a}_B(s) = G_{aBs}(s)(a_B(s) - g_B(s)) + G_{gBs}(s)g_B(s) \qquad (9)'$$

is given, and if the condition "all types of sensor characteristics are equal at all degrees of freedom and there is no interference between sensors and between the degrees of freedom (a sensor characteristic consistent condition)" is satisfied, the acceleration sensor characteristic of the main body part, the inclination angle sensor characteristic of the main body part and the force/torque sensor characteristic of the thrust transfer gate may be defined as follows:

$$G_{aBs}(s) = G_{gBs}(s) = G_{uGs}(s) = G_s(s)I \qquad (10),$$

where $G_s(s)$ is a transfer function representing an equal sensor characteristic, and I is a unit matrix. That is, $$a_{Bs}(s) = G_s(s)(a_B(s) - g_B(s)) \qquad (11),$$

$$g_{Bs}(s) = G_s(s)g_B(s) \qquad (12), \text{ and}$$

$$u_{Gs}(s) = G_s(s)u_G(s) \qquad (13).$$

In this case, equation (9)' is given as below.

[Expression 8]

$$\hat{a}_B(s) = G_s(s)a_B(s) \qquad (14)$$

Thus, the estimation of the main body part acceleration $a_B(t)$ can be performed by equation (8). A gravitational acceleration $g_{Bs}(t)$ does not explicitly appear in equation (14), and therefore it is possible to consider that the main body part acceleration $a_B(t)$ is directly measured so long as the above sensor characteristic consistent condition is satisfied.

Note that the above sensor characteristic consistent condition is realized by, for example, selecting a sufficiently high-speed response and high-precision sensor compared to the dynamics of the floating mobile object.

Second Instance

Described next is a second instance of the thrust transfer gate system according to the present embodiment.

The second instance of the thrust transfer gate system is configured as shown in FIGS. 3 and 4. FIG. 3 is a schematic diagram of a floating mobile object, and FIG. 4 is a block diagram of a control system.

In the present instance also, a floating mobile object 10 is dynamically divided into a main body part B and an effector part E, and a thrust transfer gate G is provided as hardware between the main body part B and the effector part E. In addition, the main body part B is provided with an inclination angle sensor 3, and the thrust transfer gate G is provided with a force/torque sensor.

The present instance significantly differs from the first instance in that the effector part E is a shell for covering the main body part B (a pressure hull S shown in FIG. 3), and therefore the main body part B and the thrust transfer gate G are completely isolated from the exterior by the shell S.

This structure eliminates the necessity of the acceleration sensor 2 of the main body part B, which is required in the first instance.

As in the first instance, an inertia matrix $M_B$ of the main body part and $J_{GB}$ and $J_{EG}$ representing geometric constructions of the floating mobile object are given as previously measured known matrices.

Hereinbelow, the configuration of the present instance is described in detail.

Referring to FIG. 4 for the interiors of the main body part B and the effector part E, an equation of motion representing physical dynamics of the floating mobile object can generally be written as the following equation.

[Expression 9]

$$J_{GB}{}^T u_G(t) = M_B(a_B(t) - g_B(t)) \qquad (15)$$

$$u_G(t) = J_{EG}{}^T(t)u_E(t) + f_E(t) \qquad (16)$$

Equation (15) represents the main body part, and equation (16) represents the effector part. Here, $u_{G2}(t)$ [an m-dimensional vector] is defined anew as in the following equation.

[Expression 10]

$$u_{G2}(t) = u_G(t) + J_{GB}{}^{-T} M_B g_B(t) \qquad (17)$$

Described next is a thrust planning part in the present instance.

A target thrust $u_{G2d}(t)$ at the thrust transfer gate G required for realizing a target acceleration $a_{Bd}(t)$ of the main body part B as indicated by the block of the thrust planning part P2 within a computer P in FIG. 4 is defined by the following equation.

[Expression 11]

$$u_{G2d}(t) = J_{GB}{}^{-T} M_B a_{Bd}(t) \qquad (18)$$

By controlling $u_{G2}(t)$ with a thrust control part denoted by reference character P3 within the computer P in FIG. 4, such that $u_{G2d}(t)$ is realized by thrust feedback, it is possible to construct a feedback control system for controlling a thrust by thrust feedback with less delay.

Here, for example, by applying sliding mode control to thrust control in the present instance, it is possible to construct the thrust control part P3 as below.

In the thrust control part P3 of the present instance, a thrust command $u_{Ed}(t)$ to the effector required for realizing a target thrust $u_{G2d}(t)$ is defined as in the following equation.

[Expression 12]

$$s_G(t) = J_{EG}^{+T}(t)\left\{(\hat{u}_{G2}(t) - u_{G2d}(t)) + T_G \frac{d}{dt}\hat{u}_{G2}(t)\right\} \qquad (19)$$

$$[u_{Ed}(t)]_i = \begin{cases} u_{Edi\max} & ([s_G(t)]_i < 0) \\ 0 & ([s_G(t)]_i = 0) \\ u_{Edi\min} & ([s_G(t)]_i > 0) \end{cases} \qquad (20)$$

Note that $\hat{u}_{G2}(t)$ [an m-dimensional vector] is an estimated value for $u_{G2}(t)$.

Incidentally, in the present instance, no feedback to the thrust planning part P2 is required, and only the estimated value $\hat{u}_{G2}(t)$ for $u_{G2}(t)$ in equation (17) is required for feedback to the thrust control part P3. Here, a method for estimating $u_{G2}(t)$ is described.

Hereinbelow, estimation of the gate thrust $u_{G2}(t)$ in the present instance is described.

The estimated value $\hat{u}_{G2}(t)$ for the gate thrust $u_{G2}(t)$ is defined as in the following equation.

[Expression 13]

$$\hat{u}_{G2}(t)=u_{Gs}(t)+J_{GB}^{-T}M_Bg_{Bs}(t) \quad (21)$$

Here, consider the validity of the estimation of the gate thrust. By applying the Laplace transform to equation (21), $$\hat{u}_{G2}(s)=u_{Gs}(s)+J_{GB}^{-T}M_Bg_{Bs}(s) \quad (21)'$$

is given, and if the aforementioned sensor characteristic consistent condition is also satisfied here, equations (12) and (13) are established similarly. By substituting these and considering equation (17), the following is given.

[Expression 14]

$$\hat{u}_{G2}(s)=G_s(s)u_{G2}(s) \quad (22)$$

Thus, the gate thrust $u_{G2}(t)$ can be estimated by equation (21). A gravitational acceleration $g_{Bs}(t)$ does not explicitly appear in equation (22), and therefore it is possible to consider that the gate thrust $u_{G2}(t)$ is directly measured so long as the sensor characteristic consistent condition is satisfied.

Third Instance

Described next is a third instance of the thrust transfer gate system according to the present embodiment.

The third instance of the thrust transfer gate system is configured as shown in FIGS. 5 and 6. FIG. 5 is a schematic diagram of a floating mobile object, and FIG. 6 is a block diagram of a control system.

In the third instance, the floating mobile object 10 is not dynamically divided into a main body part B and an effector part E, and no thrust transfer gate G is provided as hardware. However, the floating mobile object 10 of the present instance is provided with an acceleration sensor 2 and an inclination angle sensor 3.

In the present instance, a thrust transfer gate system is constructed as if a thrust transfer gate is present by suitably determining an inertia matrix $M_B$ of a main body part B and calculating, based on $M_B$, an estimated thrust value at a virtual thrust transfer gate G' shown within a computer P in FIG. 6 from a value measured by the sensor. As in the above first and second instances, $J_{GB}$ and $J_{EG}$ representing geometric constructions of the floating mobile object 10 are given as previously measured known matrices.

Note that examples of a method for obtaining the inertia matrix $M_B$ of the main body part B include a method in which the computer previously calculates the inertia matrix $M_B$ of the main body part B based on drawings, specifications, etc., of the floating mobile object 10 as originally designed and stores it in an unillustrated memory or the like.

Hereinbelow, the configuration of the present instance is described in detail.

Referring to FIG. 6 for the interiors of the main body part B and the effector part E, an equation of motion representing physical dynamics of the floating mobile object can generally be written as the following equation.

[Expression 15]

$$J_{GB}^T u_{Gv}(t)=M_Ba_B(t) \quad (23)$$

$$u_{Gv}(t)=J_{EG}^T(t)u_E(t)+f_E(t)+J_{GB}^{-T}M_Bg_B(t) \quad (24)$$

Equation (23) represents the main body part, and equation (24) represents the effector part. This is approximately the same as in the second instance, but it should be noted that there is no physical thrust transfer gate in the third instance, and therefore a thrust $u_{Gv}$ [an m-dimensional vector] at the thrust transfer gate is a virtual value.

Described next is a thrust planning part of the present instance.

A target thrust $u_{Gvd}(t)$ at a virtual thrust transfer gate G' required for realizing a target acceleration $a_{Bd}(t)$ of the main body part B as indicated by the block of a thrust planning part P2 within a computer P in FIG. 6 is defined as in the following equation.

[Expression 16]

$$u_{Gvd}(t)=J_{GB}^{-T}M_Ba_{Bd}(t) \quad (25)$$

By controlling $u_{Gv}(t)$ with a thrust control part denoted by reference character P3 within the computer P in FIG. 6, such that $u_{Gvd}(t)$ is realized by thrust feedback, it is possible to construct a feedback control system for controlling a thrust by thrust feedback with less delay.

Here, for example, by applying sliding mode control to thrust control in the present instance, it is possible to construct the thrust control part P3 as below.

In the thrust control part P3 of the present instance, a thrust command $u_{Ed}(t)$ to the effector required for realizing the target thrust $u_{Gvd}(t)$ is defined as in the following equation.

[Expression 17]

$$s_G(t) = J_{EG}^{+T}(t)\left\{(\hat{u}_{Gv}(t)-u_{Gvd}(t))+T_G\frac{d}{dt}\hat{u}_{Gv}(t)\right\} \quad (26)$$

$$[u_{Ed}(t)]_i = \begin{cases} u_{Edimax} & ([s_G(t)]_i < 0) \\ 0 & ([s_G(t)]_i = 0) \\ u_{Edimin} & ([s_G(t)]_i > 0) \end{cases} \quad (27)$$

Note that $\hat{u}_{Gv}(t)$ [an m-dimensional vector] is an estimated value for $u_{Gv}(t)$.

Incidentally, in the present instance, no feedback to the thrust planning part P2 is required as in the second instance, and only the estimated value $\hat{u}_{Gv}(t)$ for $u_{Gv}(t)$ is required for feedback to the thrust control part P3. Here, a method for estimating $u_{Gv}(t)$ is described.

Hereinbelow, estimation of the gate thrust $u_{Gv}(t)$ in the present instance is described.

The estimated value $\hat{u}_{Gv}(t)$ for the gate thrust $u_{Gv}(t)$ is defined as in the following equation.

[Expression 18]

$$\hat{u}_{Gv}(t)=J_{GB}^{-T}M_B(a_{Bs}(t)+g_{Bs}(t)) \quad (28)$$

Here, consider the validity of the estimation of the gate thrust. By applying the Laplace transform to equation (28), $$\hat{u}_{Gv}(s)=J_{GB}^{-T}M_B(a_{Bs}(s)+g_{Bs}(s)) \quad (28)'$$

is given, and if the aforementioned sensor characteristic consistent condition is also satisfied here, equations (11) and (12) are established similarly. By substituting these and considering equation (23), the following is given.

[Expression 19]

$$\hat{u}_{Gv}(s)=G_s(s)u_{Gv}(s) \quad (29)$$

Thus, the gate thrust $u_{Gv}(t)$ can be estimated by equation (28). A gravitational acceleration $g_{Bs}(t)$ does not explicitly appear in equation (29), and therefore it is possible to consider that the gate thrust $u_{Gv}(t)$ is directly measured so long as the above sensor characteristic consistent condition is satisfied.

Second Embodiment

Described next is an embodiment of a floating mobile object acceleration sensing system of the present invention. As in the first embodiment, the present embodiment is described in relation to an underwater robot as an application target. Note that the underwater robot is nothing less than a floating mobile object for floating in three-dimensional space, and in the case of applying an acceleration sensing system of the present invention to the underwater robot, it is necessary to compensate for influence of a gravitational acceleration as in the first embodiment, therefore it is required to provide inclination angle measurement means capable of measuring an inclination of a main body part.

In the present embodiment, a thrust transfer gate is used for estimating an acceleration of the main body part. The acceleration sensing system according to the present embodiment is configured as shown in FIGS. 3 and 7. FIG. 3 is a schematic diagram of a floating mobile object, and FIG. 7 is a block diagram of the acceleration sensing system.

In each instance of the first embodiment, the thrust transfer gate system is constructed as the control system 1 for the floating mobile object 10, whereas in the second embodiment, a thrust transfer gate G is used as a high-precision acceleration sensing system for the floating mobile object 10.

Hardware configuration of the present embodiment is exactly the same as that of the second instance (FIG. 3) according to the above first embodiment. Specifically, the floating mobile object 10 is dynamically divided into a main body part B and an effector part E, the main body part B is provided with an inclination angle sensor 3, and the thrust transfer gate G is provided with a force/torque sensor.

However, the present embodiment aims to estimate an acceleration $a_B(t)$ of the main body part with high precision, rather than control it, and therefore the present instance does not include the thrust planning part and the thrust control part.

In addition, an inertia matrix $M_B$ of the main body part B and $J_{GB}$ representing a geometric construction of the floating mobile object are given as previously measured known constant matrices. By suitably designing the inertia matrix $M_B$ of the main body part with consideration of the measuring range of the force/torque sensor at the thrust transfer gate and an acceleration range that should be sensed in the present embodiment, it is made possible to measure an acceleration with high precision.

Hereinbelow, the configuration of the present embodiment is described in detail.

The acceleration $a_B(t)$ of the main body part in the hardware configuration of the present embodiment as shown in FIGS. 3 and 7 is represented by transforming equation (15) as below.

[Expression 20]

$$a_B(t) = M_B^{-1} J_{GB}^T u_G(t) + g_B(t) \tag{30}$$

Described next is estimation of the acceleration $a_B(t)$ of the main body part in the present embodiment.

An estimated value $\hat{a}_B(t)$ for the acceleration $a_B(t)$ of the main body part is defined as in the following equation.

[Expression 21]

$$\hat{a}_B(t) = M_B^{-1} J_{GB}^T u_{Gs}(t) + g_{Bs}(t) \tag{31}$$

Here, consider the validity of the estimation of the main body acceleration. By applying the Laplace transform to equation (31), the following is given.

[Expression 22]

$$\hat{a}_B(s) = M_B^{-1} J_{GB}^T u_{Gs}(s) + g_{Bs}(s) \tag{32}$$

If the aforementioned sensor characteristic consistent condition is also satisfied here, equations (12) and (13) are established as in the first embodiment. By substituting these and considering equation (30), the following is given.

[Expression 23]

$$\hat{a}_B(s) = G_s(s) a_s(s) \tag{33}$$

Thus, it is appreciated that the main body part acceleration $a_B(t)$ can be estimated by equation (31).

EXAMPLE 1

As described in the above first embodiment section, the floating mobile object control system of the present invention performs thrust control, and therefore, to be strict, an acceleration trajectory, rather than a position/velocity trajectory, is realized. Here, it is not possible to avoid influence of drift caused by integration error in acceleration, and therefore the motion on which the present invention solely exhibits a remarkable effect is that in a relatively high frequency range. As for low-frequency slow motion, it is necessary to additionally use a conventional control technique for feeding back a position/velocity, but in such a case also, it is possible to improve precision compared to the case of using the conventional technique alone.

Hereinbelow, an example of the present invention is described in relation to a control system employing conventional position/velocity feedback control in addition to each instance of the floating mobile object control system of the present invention as described in the above first embodiment.

Figure 8:
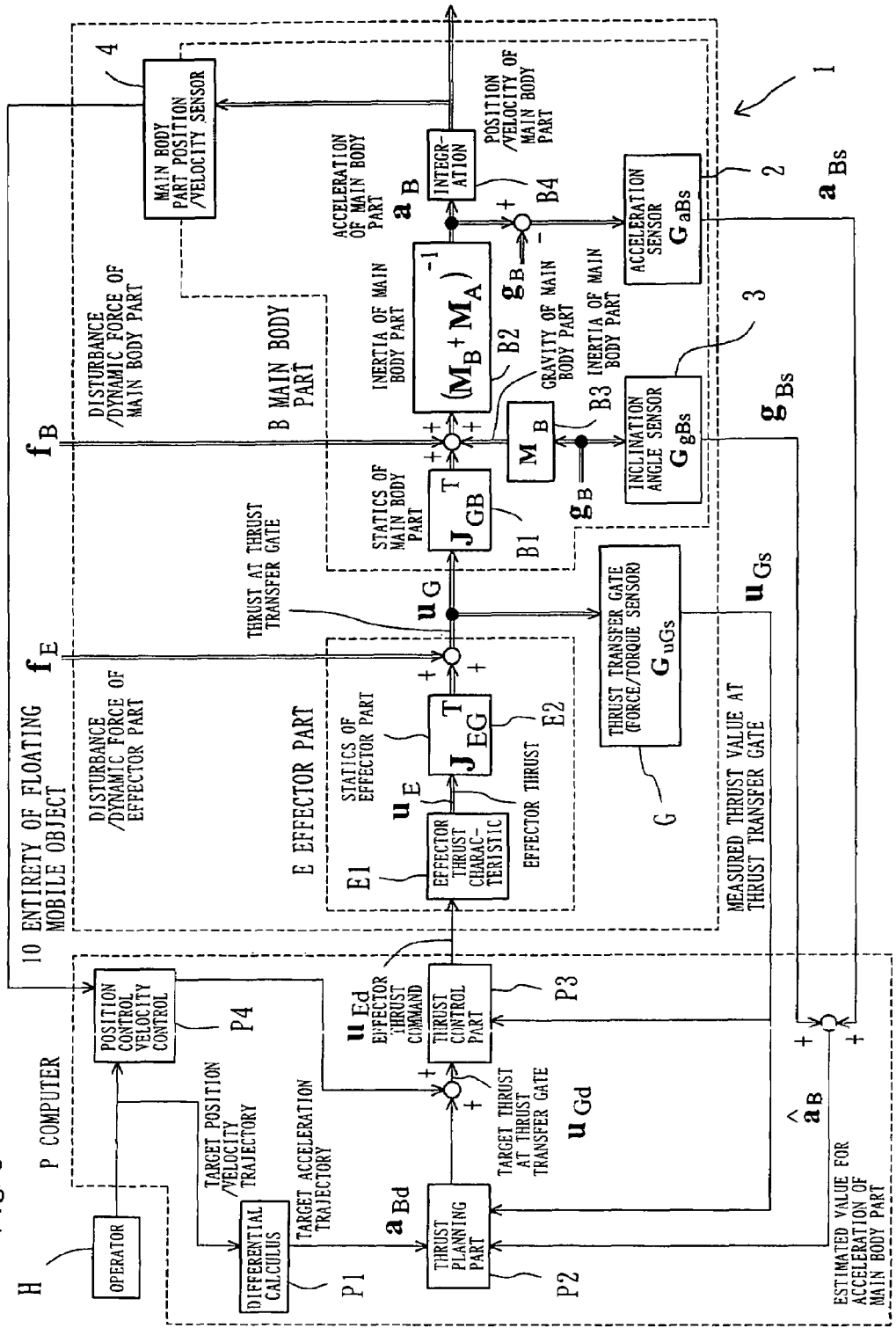
FIG. 8 is a block diagram illustrating an example of the control system of the present invention.
Figure 9:
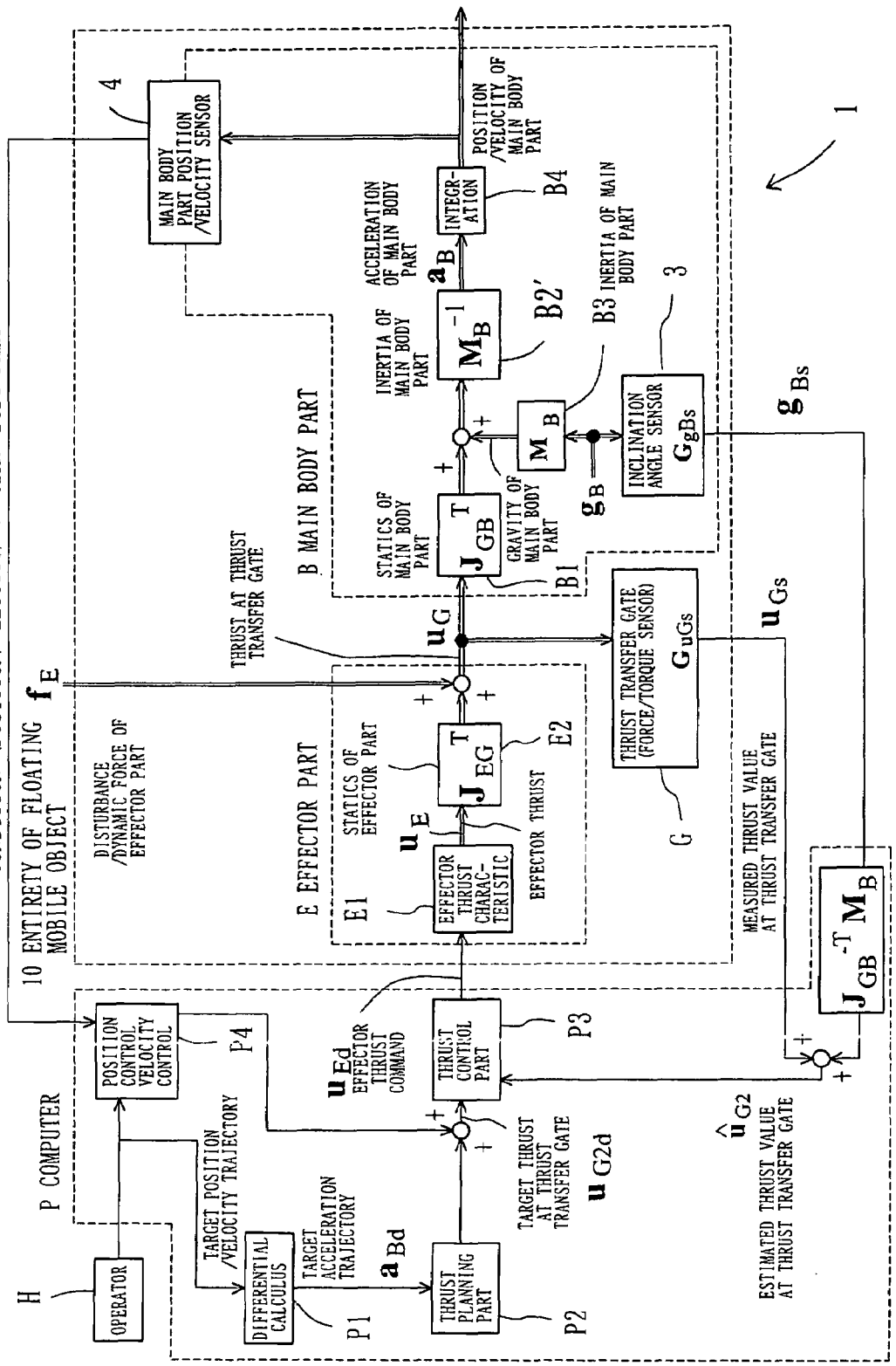
FIG. 9 is a block diagram illustrating an another example of the control system of the present invention.
Figure 10:
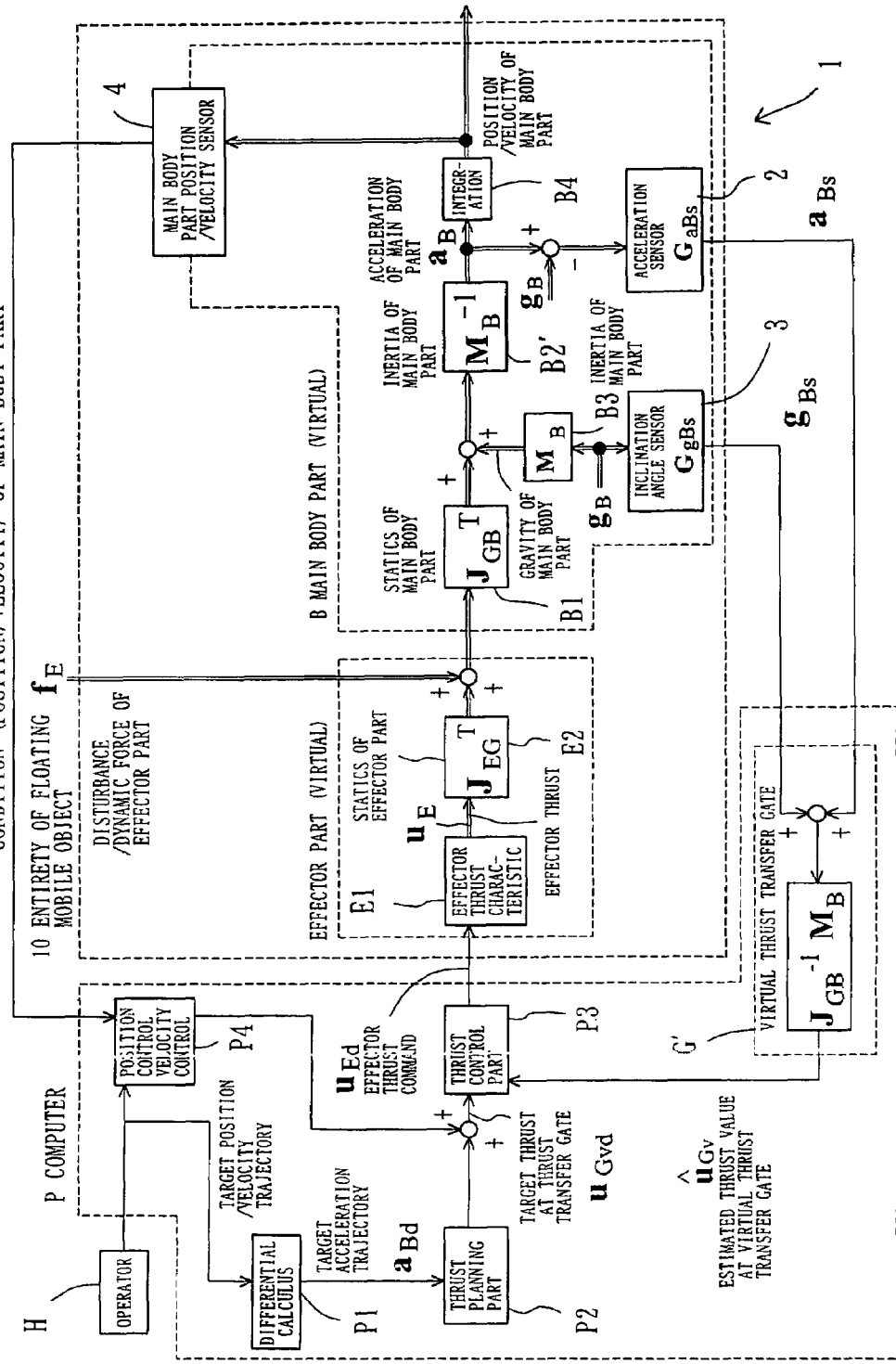
FIG. 10 is a block diagram illustrating an another example of the control system of the present invention.
Figure 11:
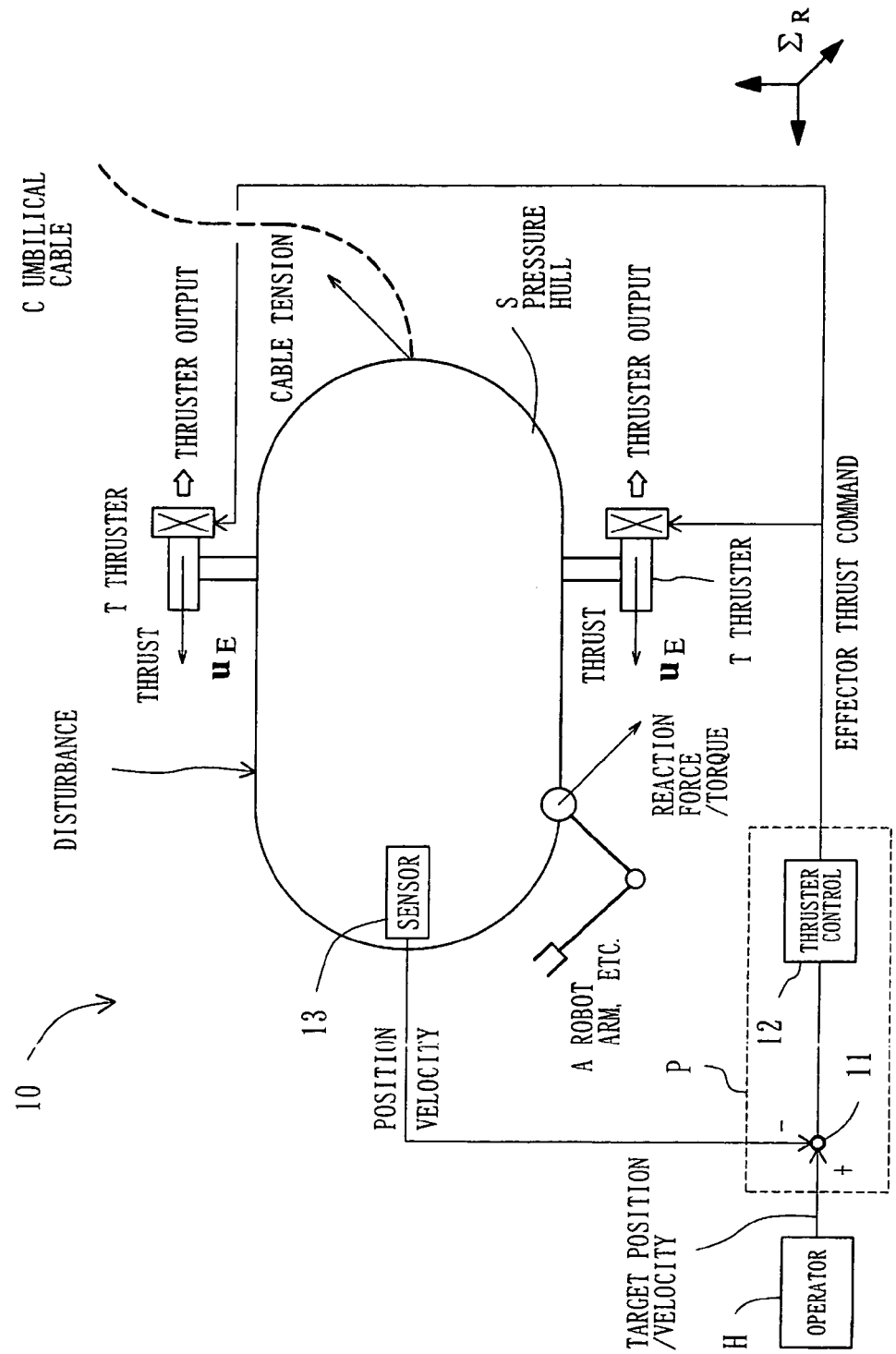
FIG. 11 is a diagram schematically illustrating a prior known floating mobile object.
Figure 12:
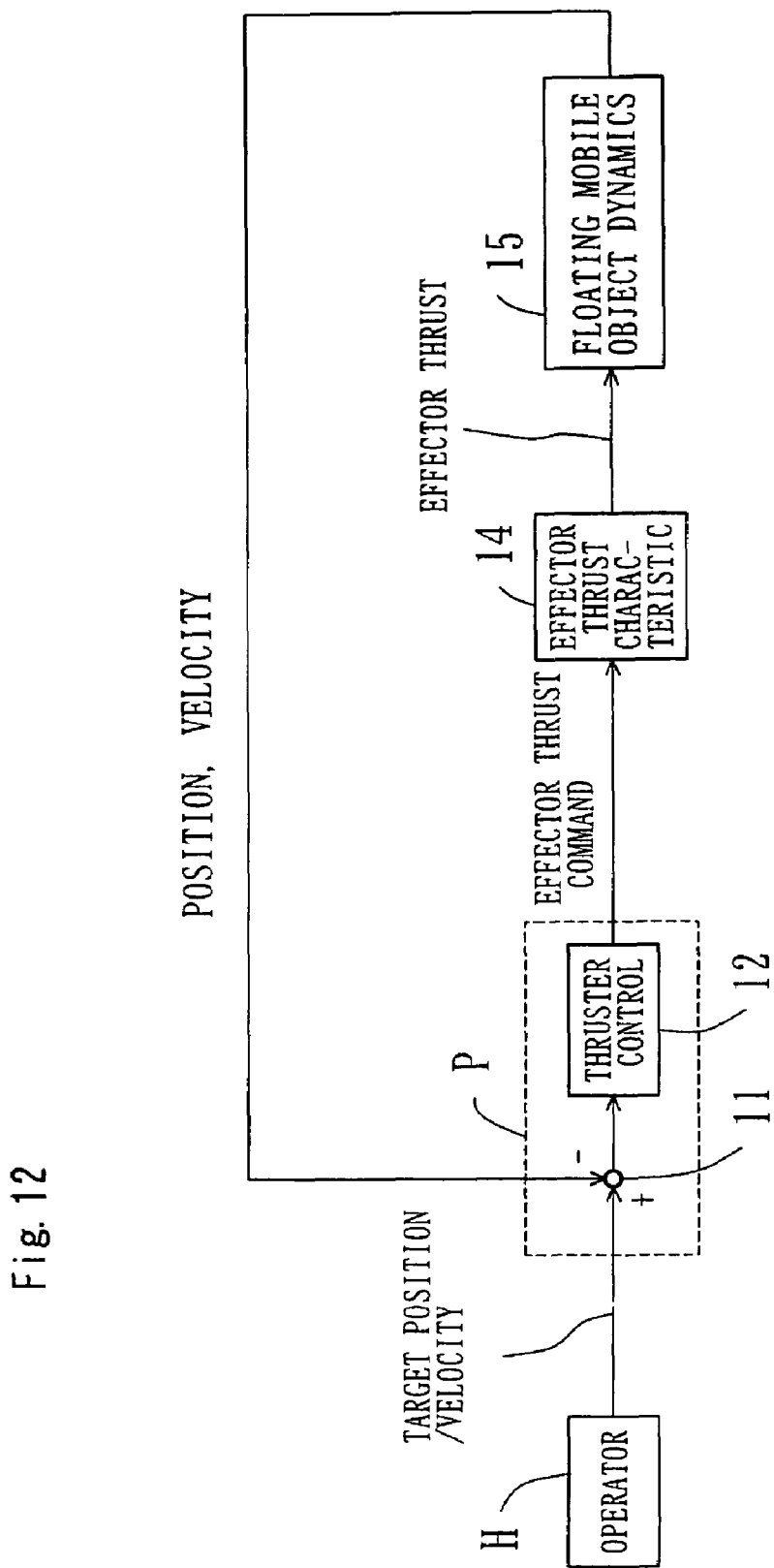
FIG. 12 is a block diagram schematically illustrating a prior known floating mobile object control system.
Figure 13:
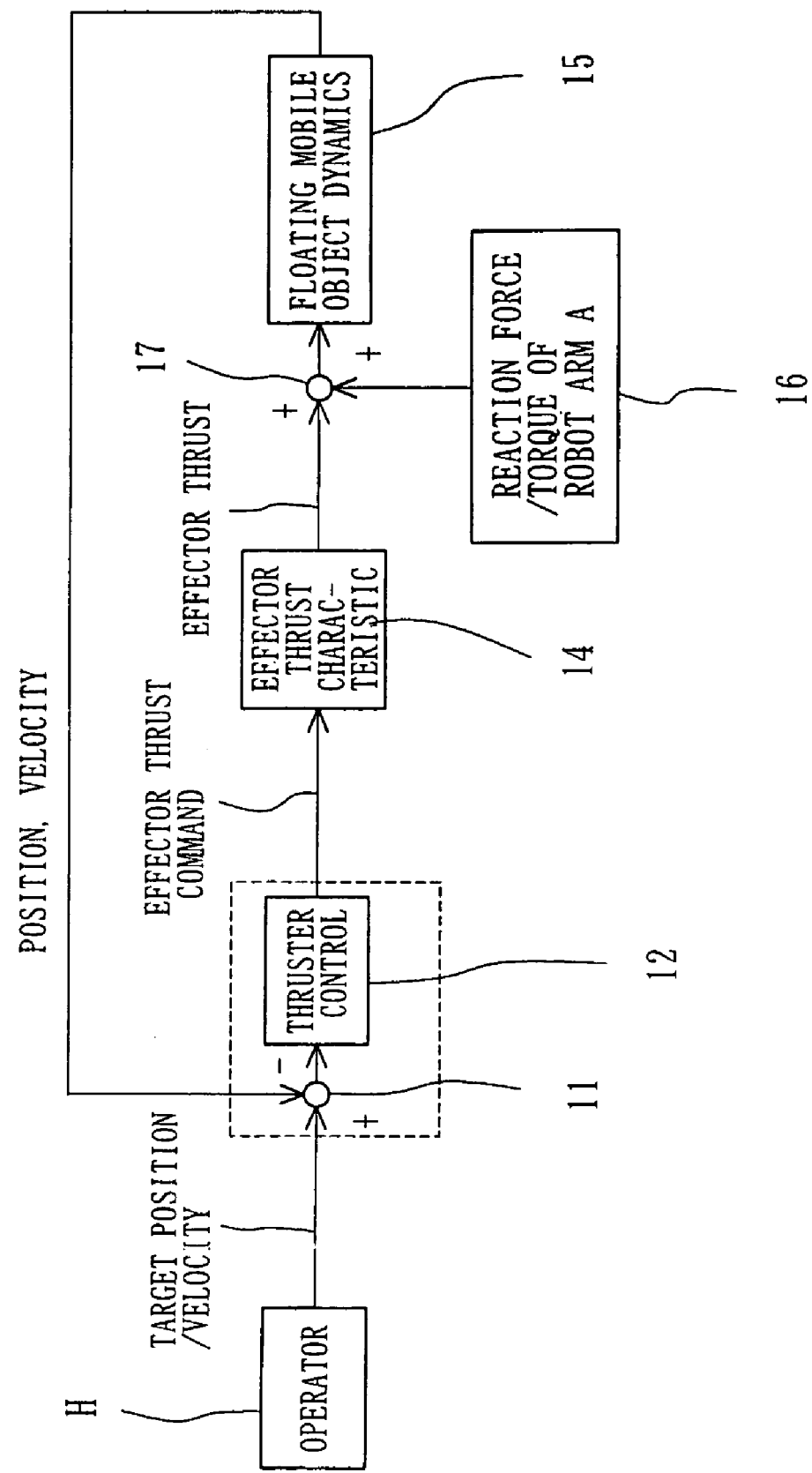
FIG. 13 is an another block diagram schematically illustrating a prior known floating mobile object control system.
Figure 14:
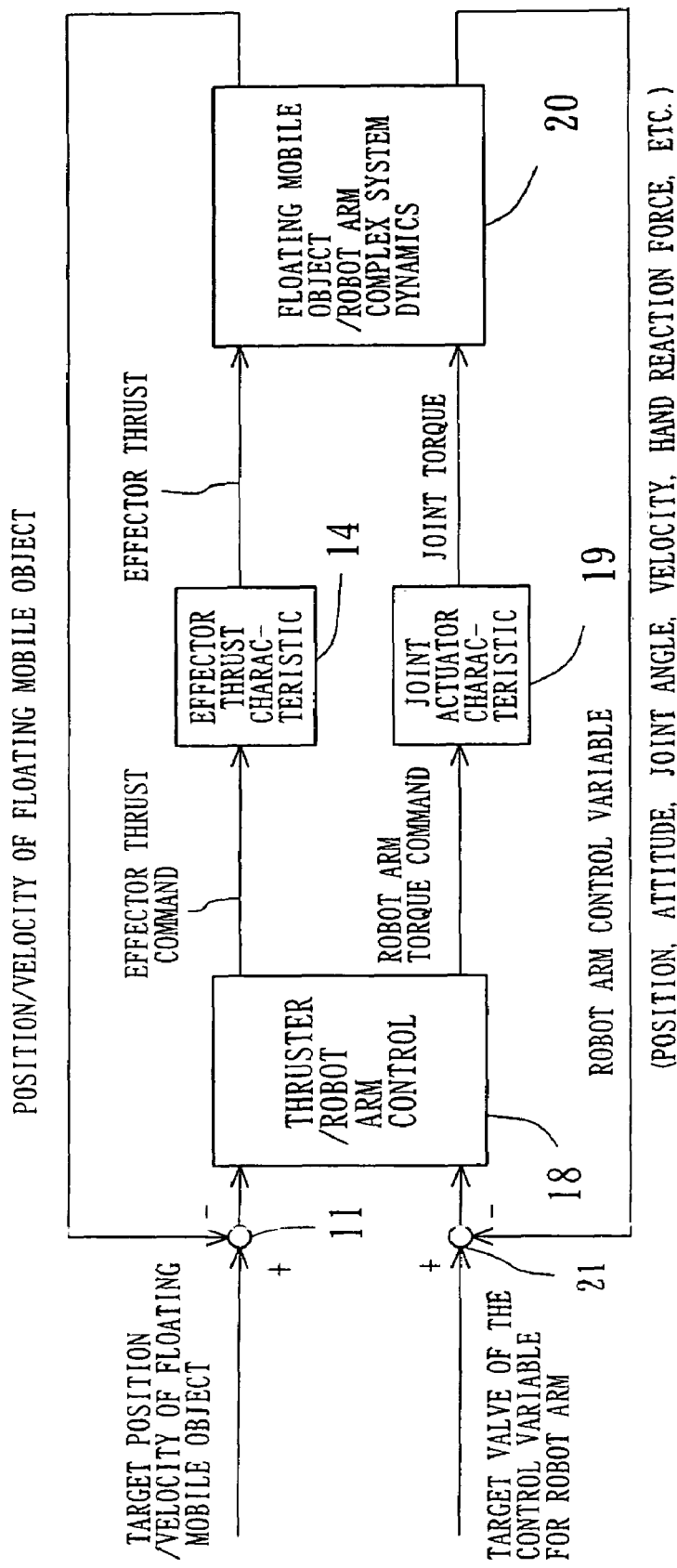
FIG. 14 is an another block diagram schematically illustrating a prior known floating mobile object control system.

Here, FIG. 8 is a block diagram illustrating an example of the control system of the present invention corresponding to the first instance of the first embodiment, FIG. 9 is a block diagram illustrating an another example of the control system of the present invention corresponding to the second instance of the first embodiment, and FIG. 10 is a block diagram illustrating an another example of the control system of the present invention corresponding to the third instance of the first embodiment. In FIGS. 8 through 10, the same elements as those shown in FIGS. 1 through 7 and 11 through 14 above are described with the same reference characters.

In addition, thin solid lines extending between blocks in FIGS. 8 through 10 represent signals as in FIGS. 2, 4, 6 and 7. On the other hand, double lines extending between blocks in a floating mobile object 10 represent phenomena (dynamic transformation action or the like) taking place as a physical action in the floating mobile object 10.

Example 1 corresponds to the above first instance of the first embodiment. FIG. 8 illustrates a block diagram of a control system 1 according to the present example. A schematic configuration of the floating mobile object 10 of the present example is as shown in FIG. 1.

As is apparent from the block diagram in FIG. 8, in the present example, the configuration shown in FIG. 2 and described in the first instance of the first embodiment is applied to a prior known position/velocity feedback control system. Accordingly, the configuration of a thrust transfer gate system portion of the present invention, the operation of the control system, etc., are described with reference to FIGS. 1 and 2 above.

The control system 1, i.e., the thrust transfer gate system according to the present example, is mainly characterized in that the mechanism of the floating mobile object denoted by reference character 10 is dynamically divided into a main body part B, which receives a thrust, and an effector part E, which generates a thrust, and a thrust transfer gate G is added to a connection therebetween. Here, the thrust transfer gate G is an only portion that connects the main body part B with the effector part E and includes a sensor (a force/torque sensor) capable of actually measuring all forces and torques applied between the main body part B and the effector part E. Note that as the force/torque sensor, a commercially available general-purpose product (e.g., a multi-channel product capable of outputting multi-dimensional force or torque components) can be used.

As such, in the present example, by connecting the main body part B and the effector part E with the thrust transfer gate G, all thrusts from the effector part E acting on the main body part B can be measured. In the floating mobile object 10 of the present example to which the thrust transfer gate system is applied, the main body part B is provided with an acceleration sensor 2 and an inclination angle sensor 3 as shown in FIG. 1.

The thus-configured control system 1 according to the present example performs thrust feedback control by the thrust transfer gate system of the present invention simultaneously as prior known position/velocity feedback control.

According to the present example, while additionally using a conventional control technique for feeding back a position/velocity to avoid influence of drift caused by integration error in acceleration, a control system, i.e., a thrust transfer gate system of the present invention, is used to allow a floating mobile object to stand still in a predetermined position with high precision, or track a target trajectory with high precision, even under disturbances caused by waves and tidal current or wind or disturbances caused by reaction, etc., of a robot arm attached to the floating mobile object, thereby making it possible to control the floating mobile object at higher speed with higher precision.

EXAMPLE 2

The present example corresponds to the above second instance of the first embodiment. FIG. 9 illustrates a block diagram of a control system 1 according to the present example. A schematic configuration of a floating mobile object 10 of the present example is as shown in FIG. 3 above.

As in example 1, the control system 1 according to the present example is mainly characterized in that the mechanism of the underwater robot 10 is dynamically divided into a main body part B, which receives a thrust, and an effector part E, which generates a thrust, and a thrust transfer gate G is added to a connection therebetween.

Note that the present example differs from the above-described example 1 in that the main body part B is contained in the effector part E, and external disturbances, reaction of a robot arm A, etc., all affect the effector part E, which is a pressure hull S. Here, the main body part B is supported only by the thrust transfer gate G in the effector part E. Therefore, as in the first example, the thrust transfer gate G is an only portion that connects the main body part B with the effector part E.

Accordingly, in the present example also, by connecting the main body part B and the effector part E with the thrust transfer gate G, all thrusts from the effector part E acting on the main body part B can be actually measured.

According to the second example also, while additionally using a conventional control technique for feeding back a position/velocity to avoid influence of drift caused by integration error in acceleration, a control system, i.e., a thrust transfer gate system of the present invention, is used to allow a floating mobile object to stand still in a predetermined position with high precision, or track a target trajectory with high precision, even under disturbances caused by waves and tidal current or wind or disturbances caused by reaction, etc., of a robot arm attached to the floating mobile object, thereby making it possible to control the floating mobile object at higher speed with higher precision.

EXAMPLE 3

The present example corresponds to the above third instance of the first embodiment. FIG. 10 illustrates a block diagram of a control system 1 according to the present example. A schematic configuration of a floating mobile object 10 of the present example is as shown in FIG. 5.

The control system 1 according to the present example is mainly characterized in that the mechanism of the underwater robot is, in an arithmetical manner, divided into a main body part B, which receives a thrust, and an effector part E, which generates a thrust, and a virtual thrust transfer gate G' is virtually provided therebetween.

Note that the virtual thrust transfer gate G' is able to estimate all forces and torques applied between the main body part B and the effector part E.

According to the third example also, while additionally using a conventional control technique for feeding back a position/velocity to avoid influence of drift caused by integration error in acceleration, a control system, i.e., a thrust transfer gate system of the present invention, is used to allow a floating mobile object to stand still in a predetermined position with high precision, or track a target trajectory with high precision, even under disturbances caused by waves and tidal current or wind or disturbances caused by reaction, etc., of a robot arm attached to the floating mobile object, thereby making it possible to control the floating mobile object at higher speed with higher precision.

[Implementation by Utilizing an Inertial Navigation Device]

Incidentally, inertial navigation devices based on existing technology widely used for floating mobile objects such as airplanes can be used as acceleration sensors, inclination angle sensors and main body part position/velocity sensors, which are used in the present invention.

Specifically, a floating mobile object having an inertial navigation device mounted therein can implement a control system according to example 3 or the above third instance of the first embodiment of the present invention by changing only software without adding/changing any hardware component, and therefore it is possible to readily realize an increase in speed and precision of an existing floating mobile object.

To describe it more specifically, it is the current situation that an existing inertial navigation device measures accelerations with sufficiently high precision, but only position/velocity information obtained by integrating them is used for control. Therefore, by using acceleration information, which has never been used as it is, for measuring a thrust within the framework of a thrust transfer gate system of the present invention, it is made possible to realize an increase in speed and precision compared to existing control without changing any conventional hardware component.

Particularly, as for the inertial navigation device, most recent inertial navigation devices are of a hybrid type in which an acceleration sensor, a gyro, a GPS (Global Positioning System) and other sensors are integrated into a unit to obtain acceleration, velocity and displacement information, and therefore the measuring speed is increased on the whole. Accordingly, the inertial navigation device can be considered as a suitable sensor unit that can be used for implementing a control system of the present invention.

Note that the configuration as described in each of the above examples is not restrictive, and various modifications in design and other variations can be made to the present invention.

While each of the above examples has been described with respect to an underwater robot to which a control system of the present invention is applied, the target to which the control system of the present invention is applied is not limited to the underwater robot. As described in the above definition section, in addition to the underwater robot, the control system of the present invention is applicable to floating mobile objects in water, air, outer space, etc., such as submersibles, helicopters, airships, aircrafts, spaceships or space robots. In addition, the control system of the present invention is applicable to air-cushion vehicles for sliding on water or ground, cars and other vehicles with slipping wheels, and various mobile objects for sliding on a plane.

Further, the instances of the above embodiment, the above examples have been described with respect to the case where a control system or an acceleration sensing system of the present invention is applied to a floating mobile object for floating in three-dimensional space. However, when applying the control system or acceleration sensing system of the present invention to a floating mobile object for floating in outer space where basically no gravity is applied or a floating mobile object for sliding on a horizontal plane for which it is not necessary to consider any inclination or it is possible to ignore any inclination, the inclination angle measurement means as defined by the inventions according to (1) through (6) above is not required. In this case, by configuring the thrust planning part and the thrust control part, such that a gravitational acceleration applied to the main body part (gravitational center) of a floating mobile object is set to $g_B=0$, it is made possible to define a control law in a more simplified manner.

In addition, in each of the above instances, sliding mode control based on an existing control technique offering robustness to a nonlinearity of an effector dynamic characteristic is taken as an example of a control law for the thrust control part P3, but the control law for the thrust control part P3 is not limited to this. For example, as the control low for the thrust control part P3, it is possible to apply PID control of input power to the thrusters T with respect to thrust error between a target thrust at the thrust transfer gate G and a measured or estimated thrust at the thrust transfer gate G. Further, in each of the above instances, a thrust generation device based on propellers dynamically connected to a motor, which is a driving source, is used as a thruster T, but the configuration of the thruster T is not limited to this. The thruster T may be of a jet type and a driving source thereof is not limited to a motor. Various types of driving sources such as an internal combustion engine, a steam turbine and a nuclear turbine may be used.

As described in detail above, it is apparent that the present invention is a novel and extremely useful invention, which provides a system structure capable of allowing a floating mobile object to stand still in a predetermined position with high precision, or track a target trajectory with high precision, even under disturbances caused by waves and tidal current or wind or disturbances caused by reaction, etc., of a robot arm attached to the floating mobile object, thereby making it possible to control the floating mobile object at higher speed with higher precision.

The invention claimed is:

1. A control system for a floating mobile object, wherein, the floating mobile object comprises:
    a main body part that can be considered as a single rigid body constituting a part of the thrust for the floating mobile object; and
    an effector part for generating a thrust for the floating mobile object; and
    a thrust transfer gate for dynamically connecting the main body part and the effector part, the thrust transfer gate being adapted to be able to actually measure a thrust from the effector part acting on the main body part,
    the main body part includes acceleration measurement means capable of measuring an acceleration of the floating mobile object, and
    a thrust command to the effector part is obtained by using:
        an output from the acceleration measurement means of the main body part; and
        a measured thrust valve from the thrust transfer gate.

2. The control system for a floating mobile object according to claim 1, wherein,
    the thrust transfer gate includes force/torque measurement means capable of measuring a force/torque applied between the main body part and the effector part, and
    the thrust command to the effector part is obtained by using:
        an output from the force/torque measurement means of the floating mobile object; and
        a target acceleration trajectory command obtained by converting an externally inputted target position/velocity trajectory command.

3. A control system for a floating mobile object, wherein, the floating mobile object comprises:
    a main body part that can be considered as a single rigid body constituting a part of the floating mobile object;
    an effector part for generating a thrust for the floating mobile object; and
    a thrust transfer gate for dynamically connecting the main body part and the effector part, the thrust transfer gate being adapted to be able to actually measure a thrust from the effector part acting on the main body part,
    the main body part is dynamically connected only to the thrust transfer gate, the main body part being adapted to receive substantially all forces acting thereon via the thrust transfer gate, and
    a thrust command to the effector part is obtained by using a measured thrust value from the thrust transfer gate.

4. The control system for a floating mobile object according to claim 3, wherein,
    the thrust transfer gate includes force/torque measurement means capable of measuring a force/torque applied between the main body part and the effector part, and
    the thrust command to the effector part is obtained by using:
        an output from the force/torque measurement means of the thrust transfer gate; and
        a target acceleration trajectory command obtained by converting an externally inputted target position/velocity trajectory command.

5. A control system for a floating mobile object, wherein, the floating mobile object includes acceleration measurement means capable of measuring an acceleration of the floating mobile object, the floating mobile object is arithmetically divided into:
- a virtual main body part that can be considered as a single rigid body constituting a part of the floating mobile object;
- a virtual effector part for generating a thrust for the floating mobile object; and
- a virtual thrust transfer gate for virtually connecting the virtual main body part and the virtual effector part, the virtual thrust transfer gate being adapted to be able to estimate a thrust from the virtual effector part acting on the virtual main body part based on an output from the acceleration measurement means, and
- a thrust command to the virtual effector part is obtained by using an estimated thrust value from the virtual thrust transfer gate.

6. The control system for a floating mobile object according to claim 5, wherein,
the virtual thrust transfer gate includes force/torque estimation means capable of estimating a force/torque applied between the virtual main body part and the virtual effector part, and
the thrust command to the virtual effector part s obtained by using:
- an output from the force/torque estimation means of the virtual thrust transfer gate; and
- a target acceleration trajectory command obtained by converting an externally inputted target position/velocity trajectory command.

7. The control system for a floating mobile object according to any one of claims 1 through 6, wherein,
the main body part or the virtual main body part additionally includes inclination angle measurement means capable of measuring an inclination of the floating mobile object, and
the thrust command to the effector part or the virtual effector part is obtained by additionally using an output from the inclination angle measurement means.

8. The control system for a floating mobile object according to any one of claim 1 through 6, wherein,
the floating mobile object additionally includes position/velocity measurement means capable of measuring a position or a velocity of the floating mobile object, and
the thrust command to the effector part or the virtual effector part is obtained by additionally using an output from the position/velocity measurement means and an externally inputted target position command or target velocity command.

* * * * *